Figure 1:
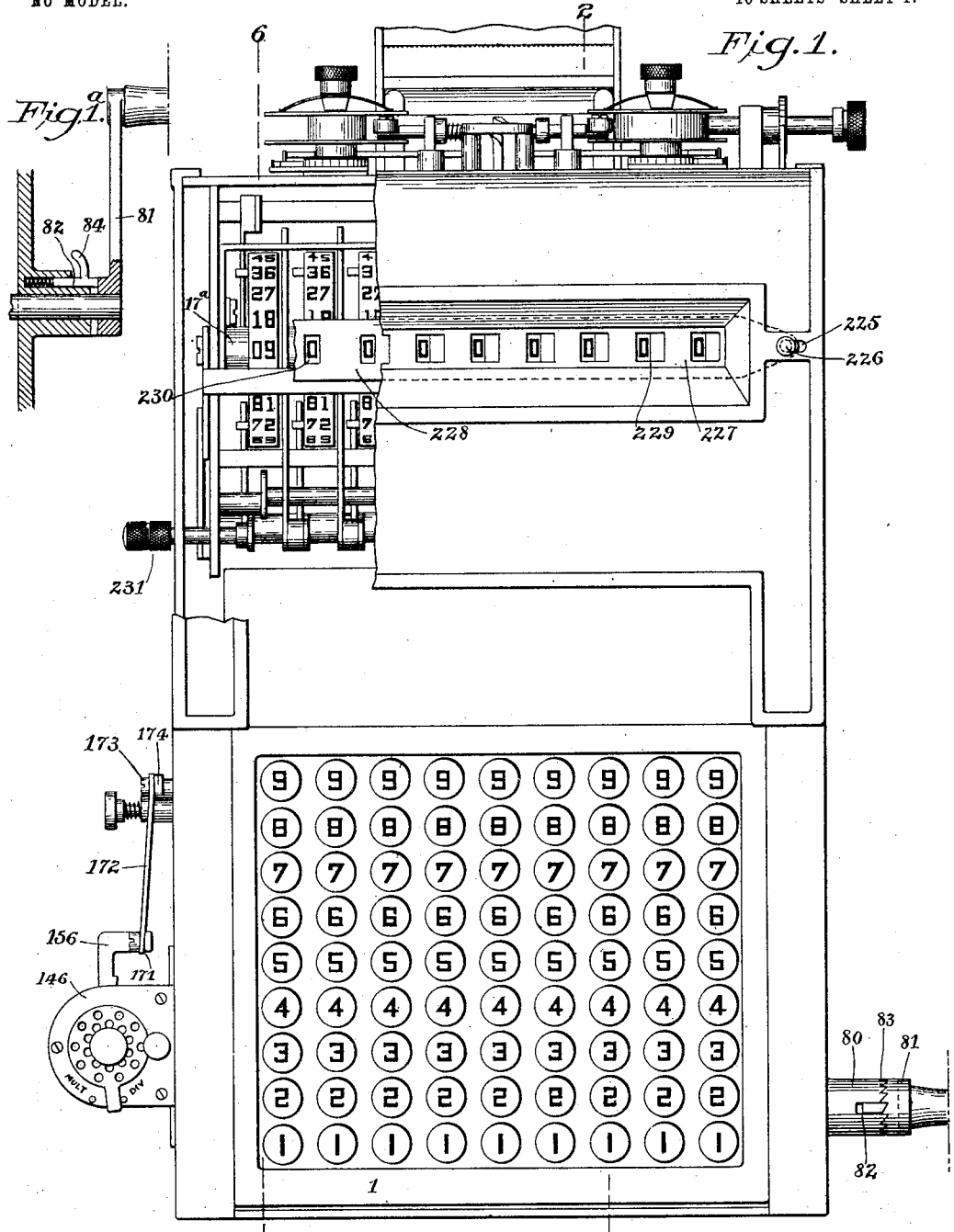

No. 746,924. PATENTED DEC. 15, 1903.
O. E. CLOUD & A. F. WOOD.
CALCULATING MACHINE.
APPLICATION FILED JULY 15, 1902.
NO MODEL. 10 SHEETS—SHEET 1.

WITNESSES:
Mae Hofmann
C. H. Ehret

INVENTORS
Otho E. Cloud
Alfred F. Wood
BY Jno. H. Lonsdale
ATTORNEY.

No. 746,924. PATENTED DEC. 15, 1903.
O. E. CLOUD & A. F. WOOD.
CALCULATING MACHINE.
APPLICATION FILED JULY 15, 1902.
NO MODEL. 10 SHEETS—SHEET 2.

WITNESSES:
Mae Hofmann
C. L. Ehret

INVENTORS
Otho E. Cloud &
BY Alfred F. Wood
Jno. R. Coasdale
ATTORNEY.

No. 746,924. PATENTED DEC. 15, 1903.
O. E. CLOUD & A. F. WOOD.
CALCULATING MACHINE.
APPLICATION FILED JULY 15, 1902.
NO MODEL. 10 SHEETS—SHEET 4.

WITNESSES:
Mae Hofmann
O. D. Ehret

INVENTORS
Otho E. Cloud
& Alfred F. Wood
BY Tho Troasdale
ATTORNEY.

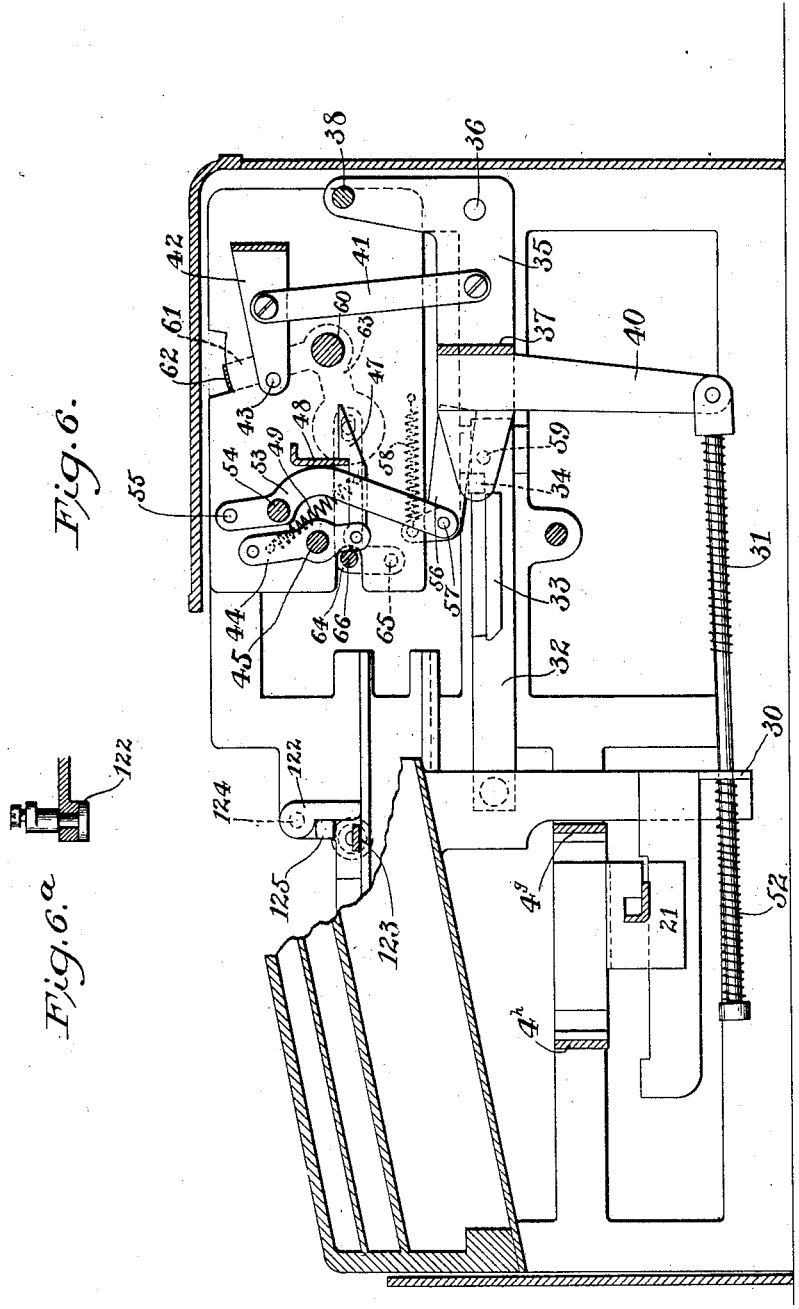

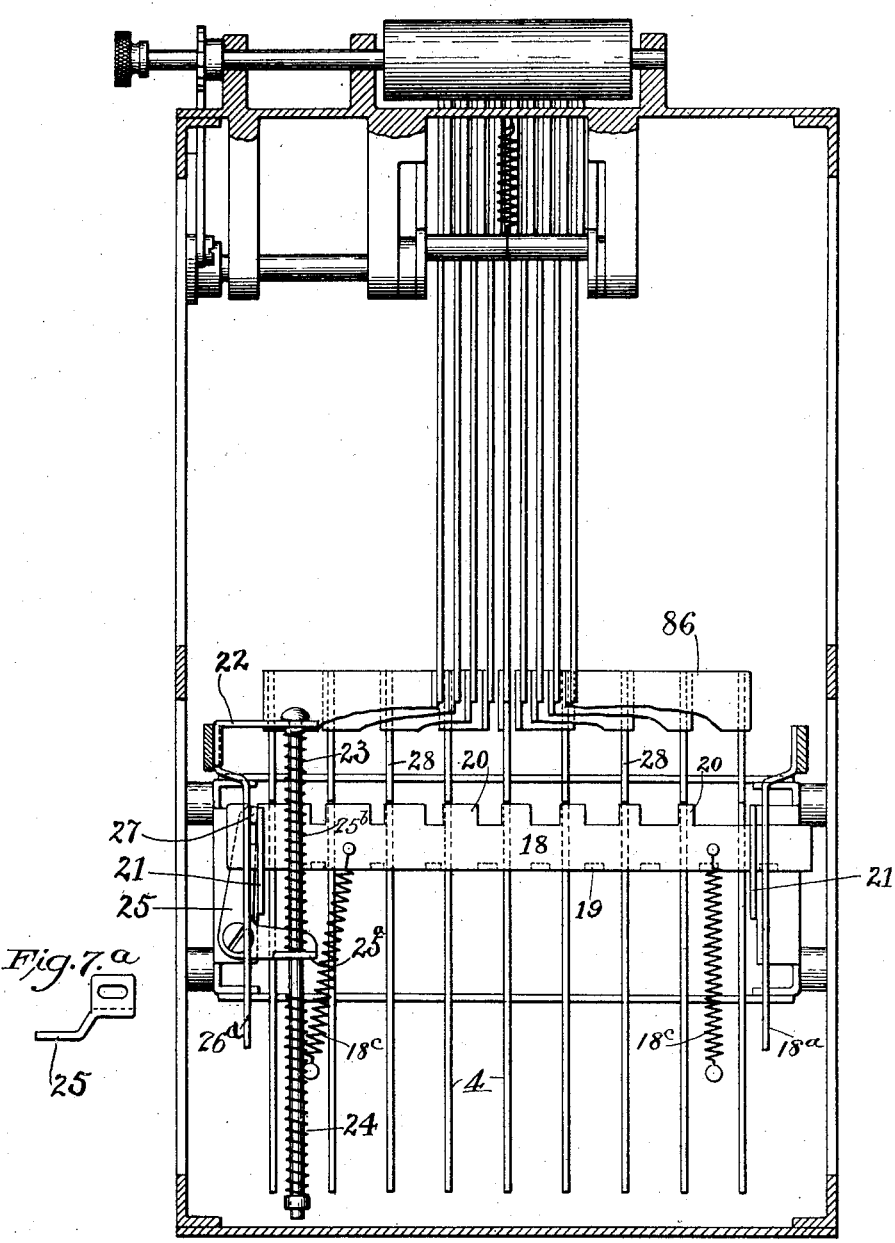

No. 746,924. PATENTED DEC. 15, 1903.
O. E. CLOUD & A. F. WOOD.
CALCULATING MACHINE.
APPLICATION FILED JULY 15, 1902.
NO MODEL. 10 SHEETS—SHEET 7.
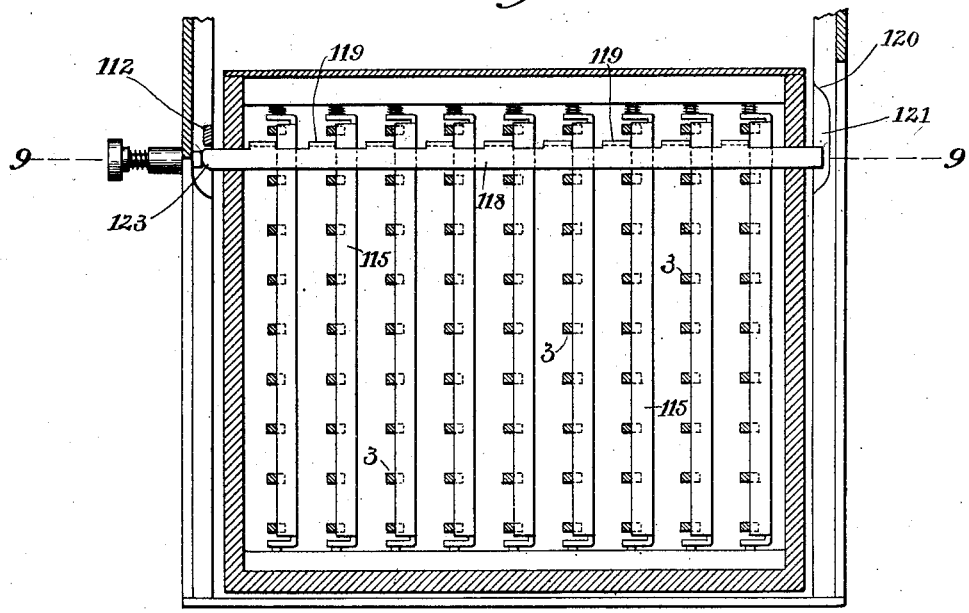
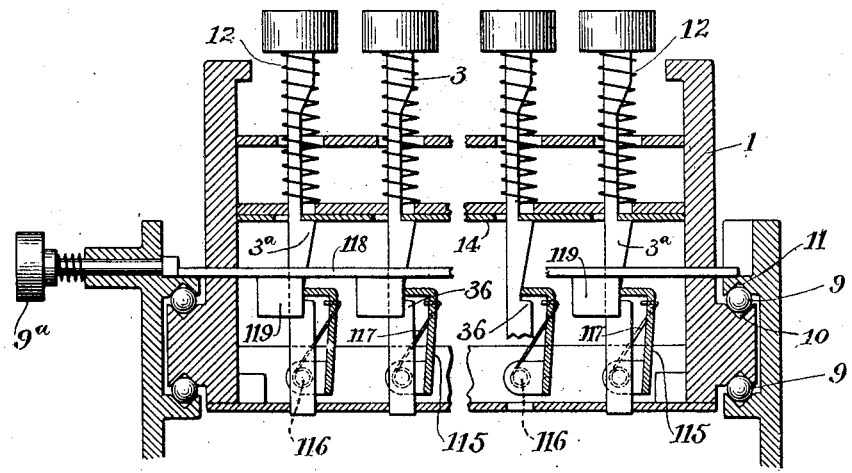

No. 746,924. PATENTED DEC. 15, 1903.
O. E. CLOUD & A. F. WOOD.
CALCULATING MACHINE.
APPLICATION FILED JULY 15, 1902.

NO MODEL. 10 SHEETS—SHEET 8.

WITNESSES:

INVENTORS
Otho E. Cloud
& Alfred F. Wood
BY
ATTORNEY.

No. 746,924. PATENTED DEC. 15, 1903.
O. E. CLOUD & A. F. WOOD.
CALCULATING MACHINE.
APPLICATION FILED JULY 15, 1902.
NO MODEL. 10 SHEETS—SHEET 9.
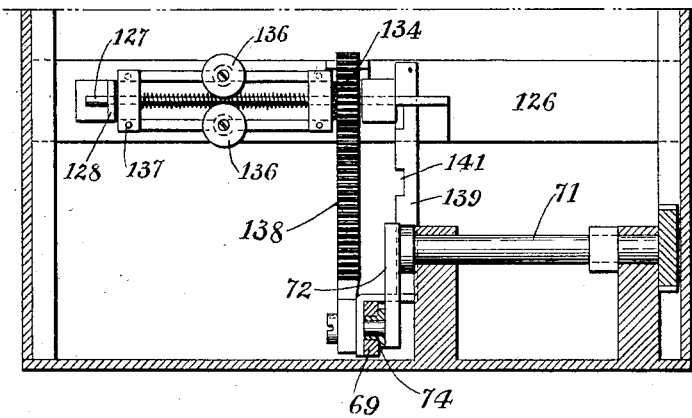
Fig. 13.
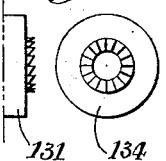
Fig. 14ª.
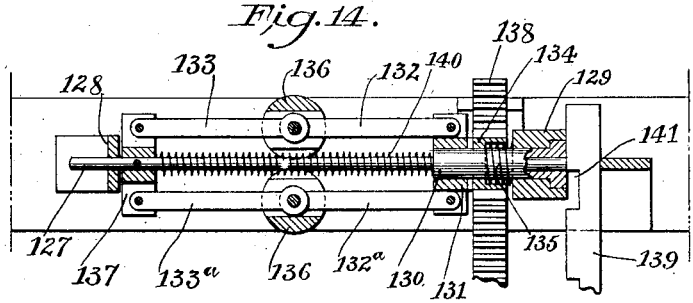
Fig. 14.
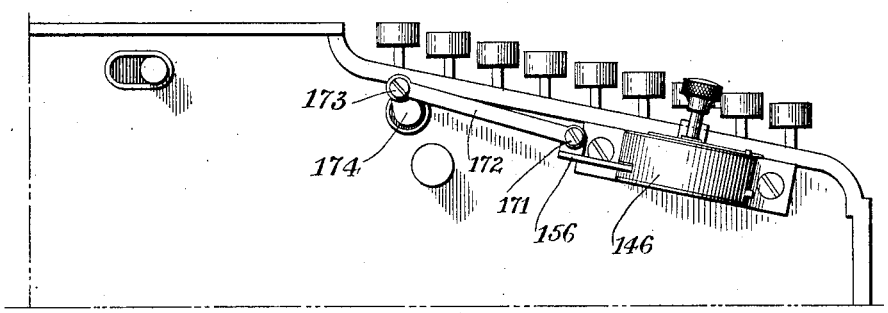
Fig. 15.
WITNESSES:
Mae Hofmann
C. D. Ehret
INVENTORS
Otho E. Cloud
& Alfred F. Wood
BY
Tho. Ewasdale
ATTORNEY.

No. 746,924. PATENTED DEC. 15, 1903.
O. E. CLOUD & A. F. WOOD.
CALCULATING MACHINE.
APPLICATION FILED JULY 15, 1902.
NO MODEL. 10 SHEETS—SHEET 10.
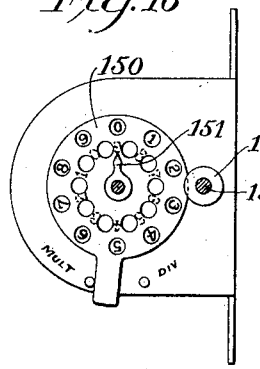
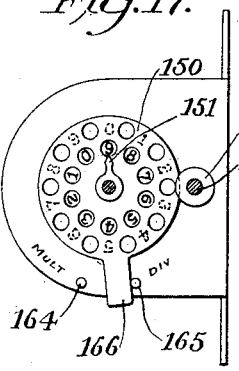
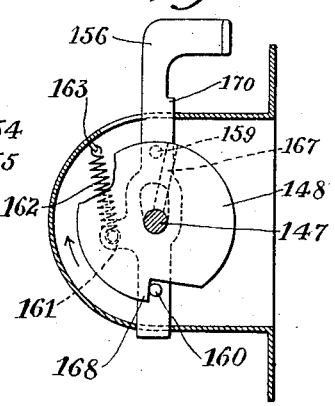
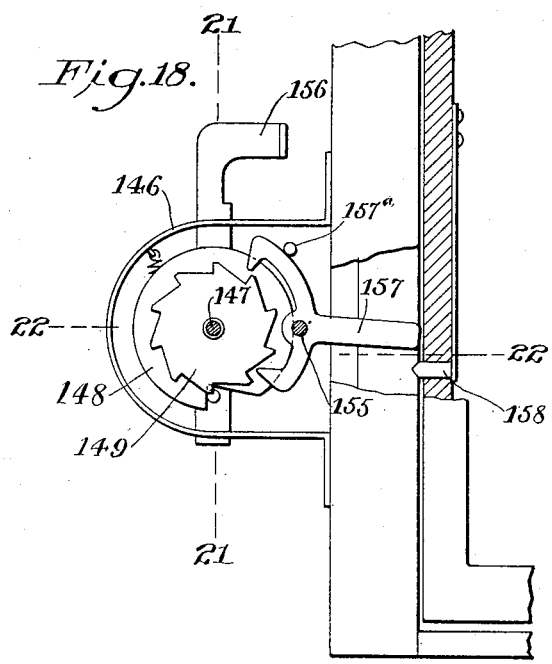
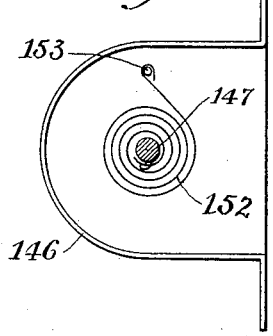
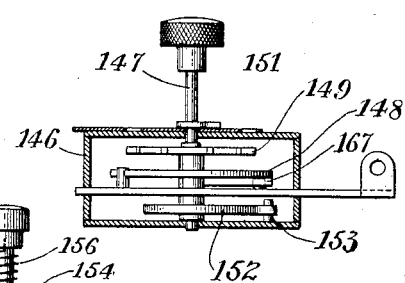
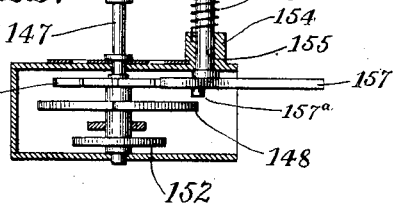
WITNESSES:
INVENTORS
Otho E. Cloud
Alfred F. Wood
BY
ATTORNEY.

No. 746,924. Patented December 15, 1903.

UNITED STATES PATENT OFFICE.

OTHO E. CLOUD AND ALFRED F. WOOD, OF PHILADELPHIA, PENNSYLVANIA, ASSIGNORS TO AMERICAN ADDOGRAPH COMPANY, A CORPORATION OF NEW JERSEY.

CALCULATING-MACHINE.

SPECIFICATION forming part of Letters Patent No. 746,924, dated December 15, 1903.

Application filed July 15, 1902. Serial No. 115,711. (No model.)

*To all whom it may concern:*

Be it known that we, OTHO E. CLOUD and ALFRED F. WOOD, citizens of the United States, and residents of Philadelphia, in the county of Philadelphia and State of Pennsylvania, have invented a new and useful Calculating-Machine, of which the following is a specification.

Our invention relates to improvements in calculating-machines, our object being to provide improved means for recording figures or series of figures by means of a visible register and means for automatically computing the sum of any desired combination of figures, the difference between any desired combination of figures, the result of the multiplication of one combination of figures by another or of the division of one combination of figures by another, means for registering said result, means for affording a visible indication of said registration, and means for printing said combinations of figures and the sum or other desired arithmetical functions of the same.

This application comprises improvements upon the structures set forth in Letters Patent to Clifford, No. 602,154, dated April 12, 1898, and No. 627,571, dated June 27, 1899, for improvements in adding-machines. We accomplish this object by the mechanism illustrated in the accompanying drawings, in which—

Figure 2:
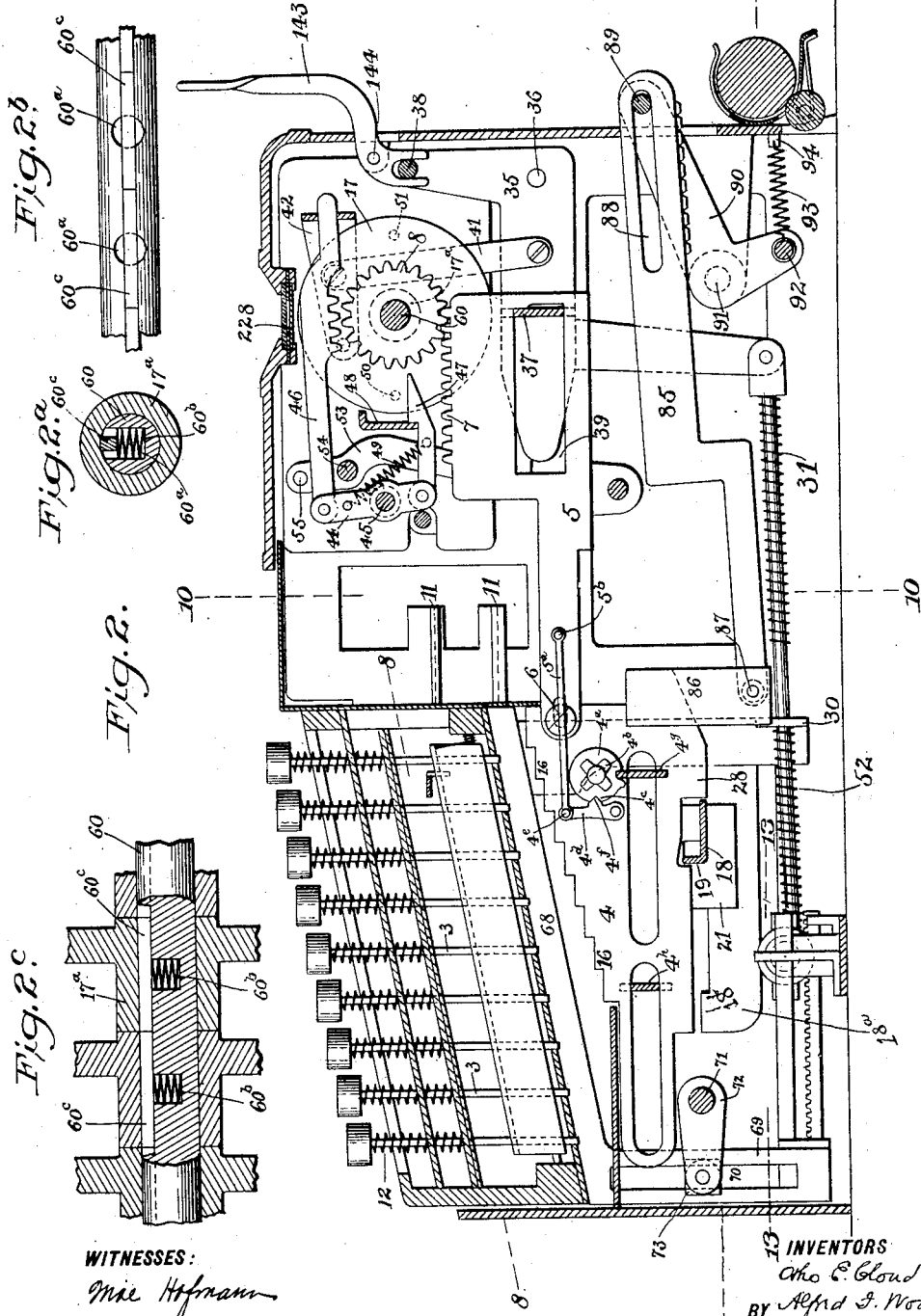
Figure 3:
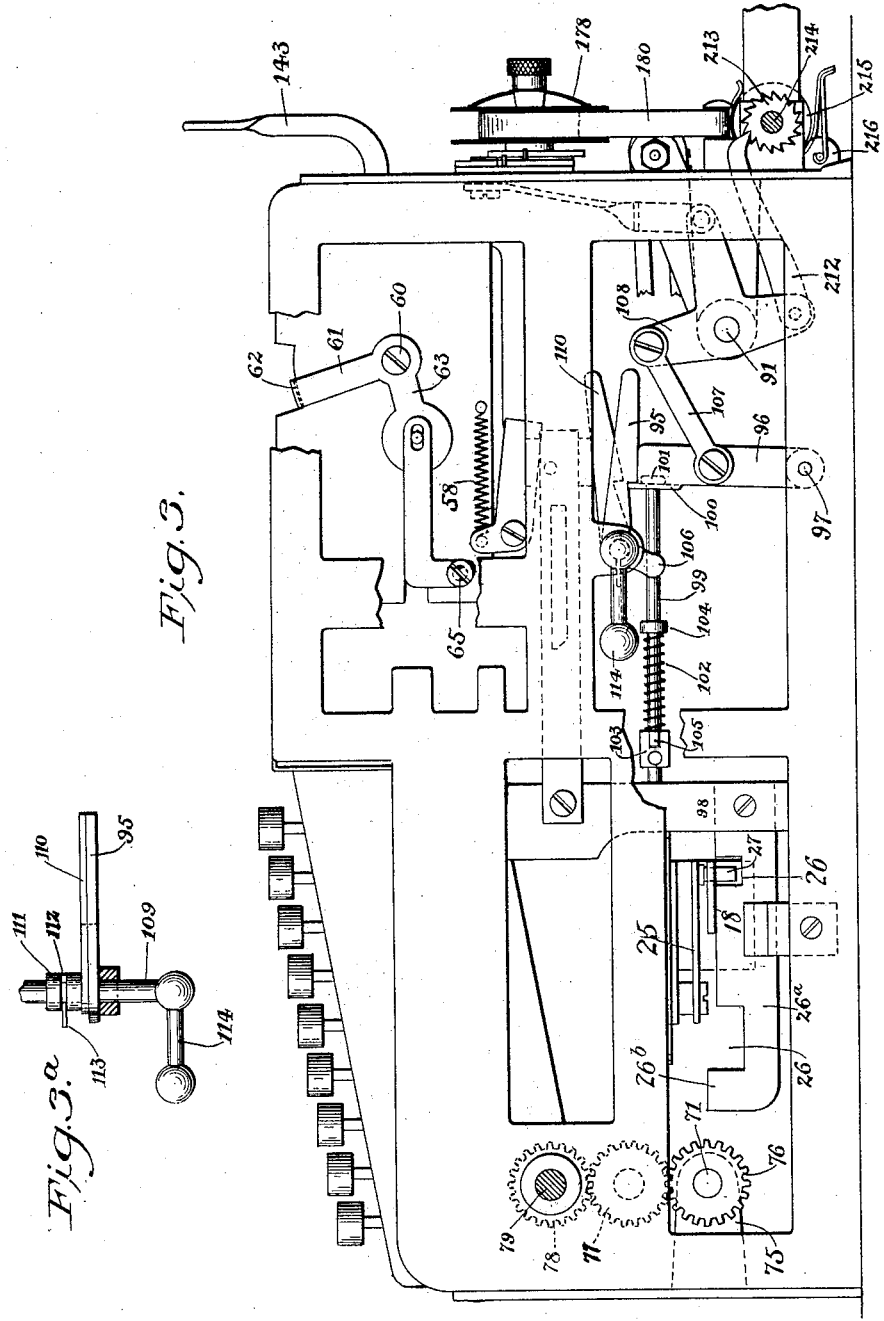
Figure 4:
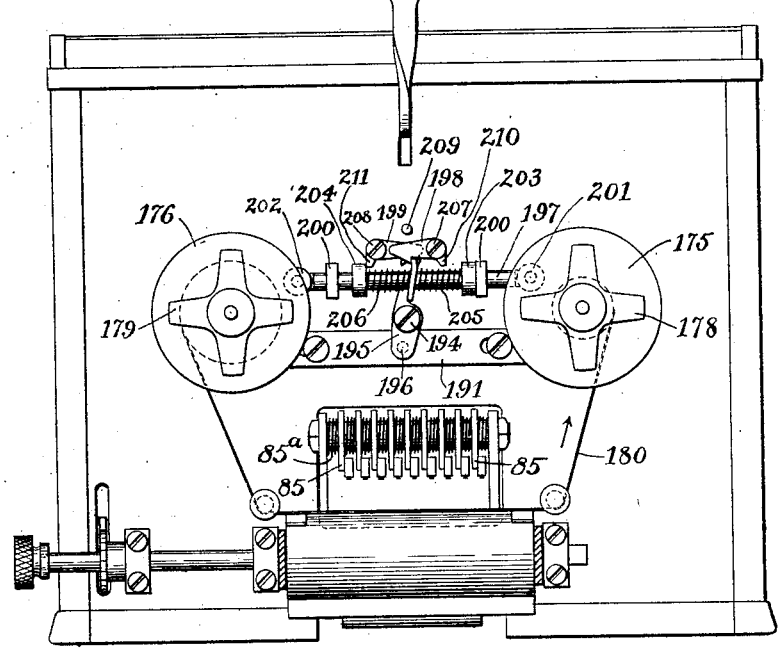
Figure 5:
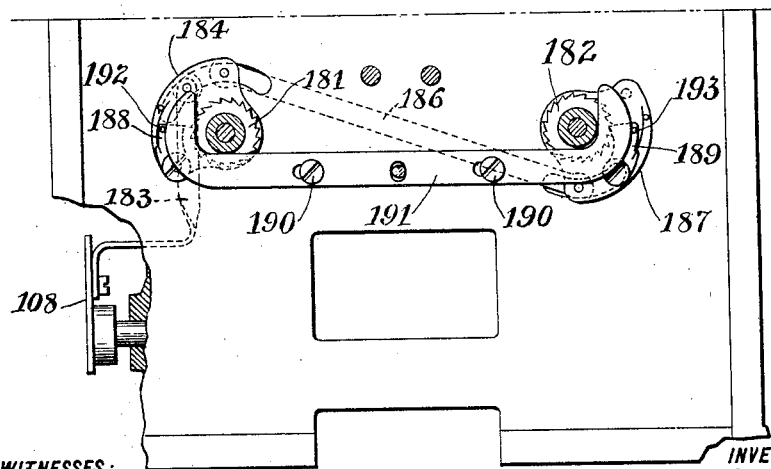
Figure 10:
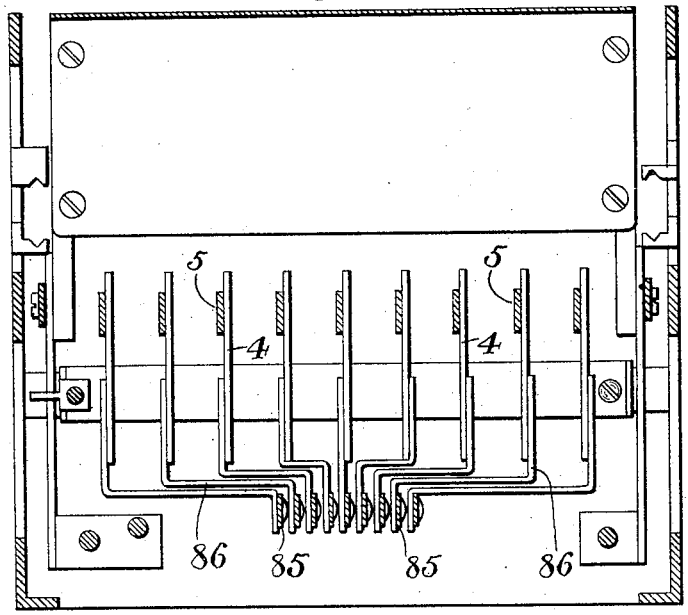
Figure 11:
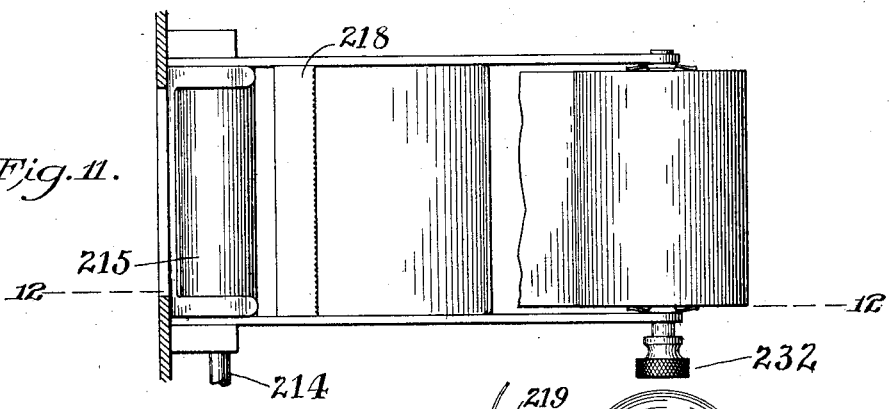
Figure 12:
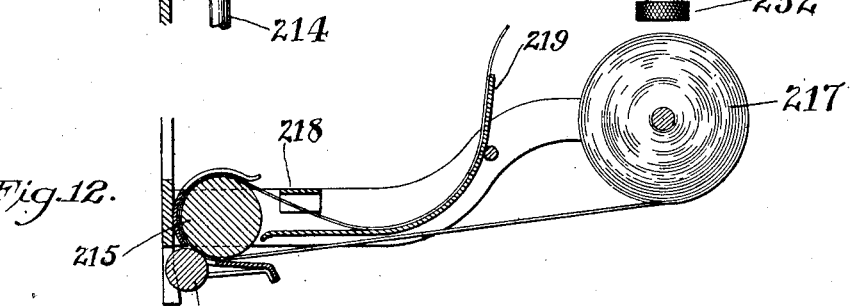

Figure 1 is a plan view of our device with part of the casing broken away to show interior arrangement. Fig. 1ª is a detail of the hand-crank and connecting parts. Fig. 2 is a longitudinal section on line 2 2 of Fig. 1. Fig. 2ª is a cross-section of the shaft and hub of the dial-wheel. Fig. 2ᵇ is a horizontal view of a portion of said shaft. Fig. 2ᶜ is a longitudinal section of said shaft and a portion of said dial-wheel. Fig. 3 is a side elevation of our device with the outer casing removed. Fig. 3ª is a detail of a portion of the mechanism shown in Fig. 3. Fig. 4 is an end elevation showing the printing mechanism. Fig. 5 is a detail of the pawl-and-ratchet mechanism for feeding the ribbon. Fig. 6 is a longitudinal section on line 6 6 of Fig. 1. Fig. 6ª is a top view of the pawl 122 shown in Fig. 6. Fig. 7 is a horizontal section on lines 7 7 of Fig. 2 looking from below, certain parts being omitted. Fig. 7ª is a detail in side elevation of bell-crank 25. Fig. 8 is a section on line 8 8 of Fig. 2. Fig. 9 is a vertical section on lines 9 9 of Fig. 8. Fig. 10 is a transverse vertical section on line 10 10 of Fig. 2. Fig. 11 is a plan view of the paper-carrying frame and adjuncts. Fig. 12 is a longitudinal section on line 12 12 of Fig. 11. Fig. 13 is a horizontal section on line 13 13 of Fig. 2, showing part of the driving mechanism and speed-controller therefor. Fig. 14 is a sectional detail thereof, showing slip-ratchet connection. Fig. 14ª is a detail showing form of ratchet-face of coöperating faces of yoke 131 and pinion 134. Fig. 15 is a side elevation of a portion of the machine, showing the indicator used in multiplying and dividing. Fig. 16 is a plan view of said indicator with a perforated disk in the multiplying position. Fig. 17 is a similar view with a perforated disk in the dividing position. Fig. 18 is a similar view with the disk and top plate removed. Fig. 19 is a similar view with escapement removed. Fig. 20 is a similar view with the cam removed, showing the spiral spring beneath. Fig. 21 is a vertical section on lines 21 21 of Fig. 18. Fig. 22 is a vertical section on lines 22 22 of Fig. 18.

Similar numerals refer to similar parts throughout the several views.

The principle of our device consists, broadly, in the combination of a series of sets of independently-operative keys acting in connection with a movable keyboard; a series of sliding members adapted to coöperate with said keys to communicate movement to a registering mechanism, said registering mechanism including means for transferring from one element to another certain multiples of figures, so that by the depression or actuation of keys corresponding to the desired combination of numbers the total or sum of said combination of numbers is automatically registered and visually indicated by said mechanism.

Our invention further comprises means for coöperating with the means above mentioned for obtaining the result of subtraction, multiplication, or division and indicating said result upon a visual register.

Our invention also includes improved means for printing or making a permanent record of the figures or combination of figures involved in said computations.

Referring to Fig. 1, 1 indicates the framework of a horizontally-movable keyboard provided with a series of sets of keys having stems vertically movable therein, said sets of keys each being numbered from "1" to "9," respectively, there being nine of said sets in the specific device shown.

Referring to Fig. 2, the keys are shown as provided with stems 3. Directly beneath each set of keys is the step-bar 4, which is properly supported and adapted to have a reciprocating horizontal movement. The member 5 has lost-motion pivot-and-slot connection at 6 with member 4 and is also suitably supported by the framework of the machine to permit of horizontal reciprocating movement. Member 5 is provided with a series of serrations 7, adapted to coöperate with the serrated wheel 8 to communicate its motion thereto. For ease of manipulation we have mounted said movable keyboard 1 upon ball-bearings 9, placed between the coöperating grooves 10 of the movable keyboard and 11 of the stationary framework of our device, as shown in Fig. 9, so as to reduce the friction between said keyboard and the supporting-framework. The vertically-movable keys are maintained in normal position by the springs 12. The stems 3 of said keys are provided with the projections 3ª to coöperate with plate 14 to limit its upward movement and to coöperate with the spring-actuated catch 115 to maintain them in the depressed position for the purpose hereinafter described.

The step-bars 4, as shown in Fig. 2, are provided with a series of steps 16, so arranged with respect to the key-stems 3 that each key of a set when depressed will cause a different movement of the step-bar upon the reciprocation of the keyboard, this being provided by so adjusting the respective distances between each key and its coöperating step on the step-bar that from the key with the highest number to the one with the lowest number each key will have a proportional lost motion before encountering the step-bar, and will thus cause a proportionally smaller movement on the step-bar. The serrated wheel 8 is made integral with the dial-wheel 17, and the adjustment of serrations 7 of member 5 and serrations on wheel 8 is such that the maximum horizontal movement in one direction of the step-bar 4 will cause approximately nine-twentieths of a revolution of the dial-wheel 17. This maximum reciprocation of the step-bar is caused by the reciprocation of the keyboard when the upper key, or key having upon it the numeral "9," is depressed, while the next key, being key with the numeral "8," will have sufficient lost motion upon the reciprocation of the keyboard to cause the step-bar and member 5 to communicate sufficient motion only to wheel 8 to cause but eight-twentieths of a revolution, and so on throughout the said keys.

The lost motion between the step-bars 4 and the rack-bars 5 has the same purpose in this machine as in the Clifford patents, hereinbefore referred to—viz., to print the significant zeros without printing the non-significant zeros. In order to accomplish this result we have, however, devised entirely new mechanism, which will now be described. Transversely disposed beneath the step-bars 4 is a plate 18, slidably mounted in supports 21. This bar has on its forward edge a series of projections 20, one projection being provided for each bar 4 and coöperating with a shoulder 28 thereon, except the bar of highest denomination, where it is obviously unnecessary, as in this denomination it is never necessary to print a zero. Said projections 20 are of different widths, those coöperating with the units and tens bars being the broadest and each succeeding projection being a little narrower in graduated ratio. The rearward edge of the bar 18 is provided with a series of upturned projections 19, one for each step-bar 4. In the normal position of the parts the projections 19 stand in line with notches in the lower edge of bars 4, as shown in Fig. 2. Said projections 19 are spaced different distances from their respective bars 4, that coöperating with the step-bar of highest denomination being nearest to its bar.

A bell-crank lever 25 is pivoted to the framework, as shown in Fig. 7. One arm of said bell-crank has a projection 25ª, through which passes a rod 25ᵇ, fixed to and movable with the keyboard. Coiled about this rod on opposite sides of said projection 25ª are two compression-springs 23 and 24. The other arm of the bell-crank 25 has a downwardly-projecting pin 27. The bar 26ª is best shown in Fig. 3, by reference to which figure it will be seen that said bar is provided with two notches 26, through which said pin 27 may pass from one side of the bar to the other. Said bar 26ª is rigidly connected with the keyboard. The construction is such that if any keys have been depressed and the keyboard is moved forward as described the bar 26ª will move forward, bringing the solid part of the bar opposite the pin 27, and thus locking the pin 27 against movement. As the motion is continued the spring 24 is compressed against the lug 25ª, with the result that as soon as the other notch 26 comes opposite the pin 27 the bell-crank is moved by the spring 24, carrying its longer arm to the right of the operator—that is to say, to the left, as shown in Fig. 7—and carrying with it the member 18. By this time the bars 4 for all banks in which keys have been depressed have been moved sufficiently to bring the notches on their under sides out of alinement with the projections 19. As said projections are normally at different distances from their respective step-bars the slide 18 will be stopped in its motion by the step-bar of highest denomination that has been operated. The relation between the projections 19 and 20 is such that this will so adjust the bar 18 that the projections 20 for all slides of denominations higher than any that have been operated will have moved free of the shoulders 28 of their respective step-bars; but the projections corresponding to step-bars of denominations lower than the highest one operated will still be in position to engage their respective shoulders 28, in case the corresponding step-bar has not been moved by a depressed key. The projection 20, corresponding to the tens step-bar, however, is so proportioned that in case no key has been depressed except in the units-bank the zero will nevertheless be printed in the tens-column. Connected to the keyboard is an arm 18$^a$, a shoulder 18$^b$ of which contacts with the rear side of the bar 18 when the keyboard has nearly reached the limit of its forward motion, and together with a similar shoulder 26$^b$ on the bar 26$^a$ moves said bar in a forward direction against the tension of spring 18$^c$. If no key has been depressed in any bank of lower denomination than a bank in which a key has been depressed, the projection 20 will strike the shoulder 28 of the step-bar of such unoperated bank and move said step-bar forward a distance sufficient to bring the zero of this bank into printing position. During this motion the rack-bar 5 of the unoperated bank is not moved on account of the lost-motion connection referred to.

It will be observed by reference to Fig. 7 that the compression of the spring 24 begins some little distance before the keyboard reaches the limit of its advancing motion, and said spring continues in a state of compression a corresponding distance after the keyboard begins its return motion, thus holding the pin 27 on the left-hand side of the bar 26$^a$, as seen in Fig. 7, until the notch 26 has passed said pin, when it is obviously impossible for the pin to return to the right-hand side of said bar until the other notch 26 reaches the pin. Before this occurs the plate 25$^a$ has begun to compress the spring 23, which presses the pin against the solid part of the bar 26$^a$ until said second notch comes opposite said pin, when the tension of said spring 23 forces the pin 27 through said notch into the position to the right of the bar, in which position it is shown in Fig. 7. This is the normal position of the parts, and in this position the spring 23 is under compression, holding the lever 25 and pin 27 in the position shown. This compression is not relieved until in the course of the advance movement of the keyboard at the next operation of the machine the notch 26 has been removed from the pin 27 and the solid part of bar 26$^a$ is opposite said pin. The pin 27 passes through a slot in bar 18, as shown in Figs. 3 and 7, and thus moves said bar longitudinally, as described.

In the forward movement of the keyboard the projection 30 encounters spring 31 and stores up power in the same. The bar 32, (see Fig. 6,) which is also connected with the keyboard, carries the projection 33 beneath projections 34, which is secured to the end of the member 35, which is pivotally secured to the frame at 36. The parts from 34 to 35 are in duplicate, said members 35 being secured to each side of the framework and being connected by a cross-piece 37 and a bar 38. Upon cross-piece 37 are supported the rack members 5, said cross-piece passing through the openings 39 of said members 5. At the end of the movement of the keyboard in the forward position projection 33 passes beyond projection 34, permitting member 35, which is connected by arm 40, which is now under the pressure of spring 31, to respond to the pressure of the spring 31 and drop down, causing the disengagement of the serrations 7 from the serrated wheel 8. The member 41 is pivoted to the member 35 and also to the member 42, which in turn is pivoted to the framework of the device at 43. The member 44 is mounted on a shaft 45, having pivoted to one of its free ends the serrated member 46. Serrated member 46 has its free end projecting in the slot of the free end of member 42, so that when 35 is depressed by the action of spring 31 it causes the consequent downward movement of 42, carrying with it the member 46 to engage its serrations with the serrated wheel 8. Pivotally secured to the other end of member 44 is the catch 47. The spring 49 is connected between said members 44 and 47, and catch 47 is normally in engagement with the crossbar 48, holding members 44 and 47 fixed, while member 46 has only a pivotal and downward movement upon each oscillation of the keyboard.

In the return movement of the keyboard to the initial position the projection 30 encounters spring 52 and compresses the same until the projection 33 has passed over and beyond the projection 34, whereupon the lever 40 will respond to the pressure of spring 52, causing the upward movement of member 35 and the disengagement of ratchet member 46 and reëngagement of member 47.

It is obvious that the register itself could be moved up and down to effect the engagement and disengagement of the rack and pinion, this being a very common arrangement in this art.

*Dial-wheels*, (Figs. 1 and 2.)—The dial-wheels 17 are mounted upon a fixed shaft 60 and are provided with hubs 17$^a$ for bearings as well as securing the proper relative spacing of said wheels across the machine. The dial-wheels are provided with pinions 8, which after the proper adjustment has been made between the teeth of said pinions and the numeral marked on the dial are secured firmly to said wheels. Wheel 17 is also provided with a peripheral dial of sufficient width to hold two parallel peripheral rows of figures, one row being printed in black and the other in red for the purpose hereinafter to be described, and each row containing two sets of numerals from "1" to "0," or in all twenty numerals, or upon the entire wheel forty numerals, the numerals in red being so disposed with respect to the numerals in black that they will increase—that is, read from "1" to "0" in the opposite direction from those of the black and the red "9" will be in alinement with the black zero, while the black zero will be in alinement with the red "9," and so on. On the opposite sides of the dial-wheels from the pinion 8 are the two pins 50 and 51, diametrically opposite each other upon a line passing through the axis of the wheel, said pins being adapted to operate the transferring mechanism hereinafter described.

The shaft 60 of the dial-wheels is channeled, as shown in Figs. $2^a$ and $2^b$, and also provided with the circular recesses $60^a$. In the channel are located the members $60^c$, corresponding as to their longitudinal extensions with the sides of the hubs $17^a$ of the dial-wheels respectively within which they are located. Beneath these members $60^c$, in the circular recesses $60^a$, are placed the compression-springs $60^b$, which serve to press the members $60^c$ against the surrounding hubs of the dial-wheels 17, which yielding pressure, while permitting a free movement of the dial-wheels when actuated by the mechanism provided therefor, serves to prevent independent movements or spinning of the dial-wheels.

In the top of the casing is the row of apertures 229, extending across the machine and over the nine dial-wheels. These apertures 229 are approximately square and outline the pairs of numerals black and red on each dial. Beneath this row of apertures 229 is a sliding plate 228, having a row of nine apertures of corresponding dimension with that of apertures 229 as to their longitudinal extension, but of one-half of the lateral extension of apertures 229. This sliding member 228 has a movement equal to the lateral dimension of its apertures and is so disposed with respect to the apertures 229 that a movement in one direction—say to the left, as shown in Fig. 1—causes the exposure of the black numerals upon dial-wheels, while the movement of the sliding member in the opposite direction causes the exposure of the red numerals only, for the purpose hereinafter to be described. The movement of the sliding member is caused by the movement of the knurled knob 226 laterally in slot 225.

*Carrying mechanism*, (Fig. 2.)—The pins 50 and 51, above mentioned, on the dial-wheels are adapted to engage the catches 47, operating the serrated member 46 of the next higher dial-plate, so that upon the movement of any dial-plate one-half of a revolution of ten figures one of said pins encounters the catch 47, pressing it downward free from cross member 48, whereupon the upper part of member 44, responding to the spring 49, throws the serrated member 46 forward while out of engagement with the pinion 8, so that upon the complete forward movement of the keyboard when the member 35 descends, causing the engagement of serrated member 46 with pinion 8, it is in this advanced position, and upon the return of the keyboard to the initial position, the lever 53, carrying a connecting-bar 54 across the entire series of members 44, is actuated to bring the serrated member back to its normal position before its disengagement with pinion 8, thus causing the advancement one point of the dial-wheel, which, as before indicated, is the dial-wheel just above the wheel operated. Thus every time any dial-wheel is operated ten points it communicates one point to the dial-wheel next above it in order. The connecting-bar 54, which is carried on the levers 53, which is actuated to bring the serrated member back to the normal or initial position, is also limited in its movement in the opposite direction by the cross-piece 48 and serves to limit the forward movement of the serrated member 46, so that it cannot be advanced more than one tooth.

Lever 53 is pivoted to the framework at 55 and carries at its lower free end the pawl 56, pivoted at 57 and controlled by spring 58, which serves the double purpose of keeping the lower end of the pawl down and the lower end of member 53 advanced. By "advanced" we mean in a position away from the operator. When the parts are in their normal positions, as shown in Fig. 6, the pawl 56 rests on lug 34, which, as has been stated, is rigid on frame 35. Just back of lug 34 is a stud 59, projecting inward under pawl 56 from arm 32. When the keyboard advances, flange 33 moves under lug 34 and pin 59 advances with arm 32 to a position some distance in advance of the end of pawl 56. When the keyboard reaches its most advanced position, frame 35 drops, lug 34 moving to a position lower than flange 33. As the keyboard returns flange 33 moves above lug 34, holding the same down, thus permitting pawl 56 to drop until its right-hand end, as seen in Fig. 6, is in the path of stud 59, which strikes said end of said pawl and moves the same, thus swinging arm 53 and actuating the transfer devices. When the keyboard reaches its normal position, lug 34 escapes past the end of flange 33 and is thrown up with frame 35 by the spring 52, which is now under compression. As lug 34 rises it strikes pawl 56 and moves it out of engagement with stud 59, whereupon pawl 56 and arm 53 are restored to their normal position (shown in Fig. 6) by the spring 58". When pawl 56 is moved toward the operator by stud 59, the bar 54 pushes back any levers 44 which have been tripped, thus moving the serrated members 46 to effect the transfer and permitting the latches 47 to catch under bar 48 and hold the parts in normal position.

The catch 47 is of such a length that if the pin 50 moves only from "9" to "0" the pin will hold the catch in its depressed position. This is what occurs when in the act of transferring a "9" is changed to "0." When this occurs, the addition is not complete, because it is still necessary to transfer to the next higher wheel the unit indicated by the passage of the former wheel from "9" to "0." In order to prevent the operator from reading the register at such a time, we have provided an authenticating and capacity lever. (Best shown in Fig. 6.) This device for authenticating, as it were, correctness of the addition consists of a shield 62, pivoted to shaft 60 by arms 61. This dial-lever 61 is provided with counterweighted arm 63, having a pin-and-slot connection with the members 64, which is pivoted to the framework at 65 and which carries the cross-bar 66. When the catches 47 are all in engagement with the cross-bar 48, as shown in Figs. 2 and 6, the members 61, 63, and 64 will be normally held in the position shown in Fig. 6, with the shield 62 in the open position. Upon the operation of any of the transferring devices causing the disengagement of 47 from 48 and the forward movement of the upper part of lever 44 the lower part of said lever 44 will encounter the cross-bar 66 of member 64, causing its rearward movement and the consequent forward movement of the shield 62 to cover the numerals on the dial-plates. This shield or shutter 62 will obviously be kept in the closed position or position of obscuring the dial-plates until all the transfer mechanisms which have been engaged are returned to the normal position, in which 47 is again in engagement with 48 and cross-bar 66 is permitted to remain in the position shown in Fig. 6. The knurled knob 231 is connected with the shutter mechanism for manual operation by returning shutter or shield to normal position.

In case the wheel stands at "9," and this is changed to zero by transfer from a lower wheel, the catch 47 of the higher wheel will be held down by the pin 50 until the bar 54 returns to normal position and the bar 46 has been lifted out of engagement with the pinion 8. The lever 44 will then be oscillated, pushing the bar 46 rearward one space and through the bar 66, causing the shield 62 to move over the register-wheel and obscure the indication. This will signify to the operator that there is an uncompleted addition and that the lever must be operated again in order to effect the transfer.

By "return" movement of the keyboard is meant its movement from the forward to the normal or initial position before the same is operated, and upon every return movement of the keyboard the pawl 56 and lever 53, to which it is secured, are operated in the manner above described, irrespective of whether or not any of the transfer mechanisms have been operated.

The mechanism for reciprocating the keyboard may be described as follows: As above described, the keyboard is supported by means of antifriction ball-bearings 9, operating between grooves 10, seated in projections from the sides of the keyboard, and grooves 11, located in the coöperating projections of the framework or case, as shown in Fig. 9. Secured to the lower part of the keyboard is the member 68, having a downward extension 69, provided with the vertical slot 70. Mounted on the shaft 71 is the crank 72, which has operative connection with the member 69 by the sliding box 73, working in slot 70. Said shaft 71 is supported on lugs or projections 75, extending from the front plate. Also mounted upon shaft 71 is a gear-wheel 76. Suitably mounted on a stud secured to the side frame is the gear-wheel 77, meshing with gear-wheel 76, and suitably mounted above said wheel 76 is the gear-wheel 78. Said gear-wheel 78 is rigidly mounted on the shaft 79, which is rotatably journaled through the side of the casing, and the boss 80, extending therefrom, and is provided with the manually-operative crank 81. The serrations of the gear-wheels 76, 77, and 78 are of equal ratio. The intermediate wheel 77 is for communicating movement from 78 to 76 and permits the disposition of 78 so as to allow clearance for the hand-crank, the train of gears being in the same ratio. It will now be seen that by the turning of the hand-crank motion is communicated to and through crank 72, operating through the sliding box 73 in the slot 70 of projection 69 of member 68, causes the forward and backward movement of the keyboard. A full rotation or turn of the hand-crank is necessary for a complete reciprocation of the keyboard. The great advantage of this means of reciprocating the keyboard—namely, the sliding-box mechanism (commonly called the "Ericson" sliding box)—is that it insures a gradual initial and final movement in each direction of the keyboard as compared with the intermediate part of said movement—that is, while the major portion of the movement of the keyboard in either direction may be very rapid, the end of the forward stroke, the reversal of direction, and the initial part of the return stroke of the keyboard is comparatively slower, smooth, and without shock to the machine, which in a device of this class is most important. Seated in the boss 80 we have provided the spring-actuated catch 82, (see Figs. 1 and 1ª,) adapted to coöperate with the serrations or face-ratchet 83 in the hand-crank to permit the turning of the hand-crank normally in one direction only to insure getting the full stroke of the keyboard. The pawl and ratchet described are to prevent the operator from turning the handle backward at any time, so that after the handle has been started from normal position the keyboard must be given a complete reciprocation forward and back in order to get the handle to normal position again. This spring-actuated catch 82 is provided with the thumb-piece or projection 84, so that the catch may be readily pushed back out of engagement with the serrations in the crank in case it is desirable or necessary to turn the crank in the opposite direction.

We provide the following mechanism for taking up the lost motion in slot-and-pin connection 6. The cam $4^a$ is pivotally secured to the step-bar 4 under restraining pressure of friction-spring $4^b$. This cam $4^a$ is provided with a notch $4^c$. The lever $4^d$ is pivoted to the step-bar, having its free end pivotally secured at $4^e$ to one end of the connecting-rod $5^a$, the other end of which is pivotally secured to the ratchet-bar 5 at $5^b$. The lever $4^d$ has a projection $4^f$, adapted to engage with the notch $4^c$. Upon the forward movement of the step-bar 4 the cam $4^a$ is rotated over the cross-bar $4^g$, causing the withdrawal of projection $4^f$ from the notch $4^c$. This causes the movement of the lever $4^d$ in the direction away from the cam $4^a$, which, by cause of its connection with ratchet member 5 through rod $5^a$, prevents any forward movement of ratchet member 5 until the pin of slot-and-pin connection 6 has reached the other end of said slot.

*Printing mechanism*, (Figs. 2 and 7.)—The type-bars 85 are connected with the step-bars 4 by the angle-bars or offset connections 86, said connection between the angle-bar 86 and the type-bar 85 being a pivotal connection at 87, said type-bar being provided on the lower side of its free end with the series of numerals or characters corresponding to the numerals or characters upon the dial-wheel operated by the same step-bar. In the free end of the type-bar 85 is the slot 88, in which operates the cross-bar 89, which is carried at one of its free ends by a pair of bell-cranks 90, pivotally secured at 91 to lugs connected with the framework of the case. At the other respective free ends of the bell-cranks 90 is secured the cross-bar 92, which is connected by the spring 93 to the lug 94, secured to the framework or case. The operation of said spring 93 is to counterbalance the type-bar 85. By interposing the coil-springs $85^a$, as shown in Fig. 4, slight friction is provided between the bars and the springs to prevent their undue free play. Mounted on a cross-shaft secured to the framework of the device is the catch 95, Fig. 3, which is adapted to engage the vertically-disposed lever 96, which is pivoted to the framework at 97. The rod 99 is secured at one end to the side plate 98 of the key-box, having its other end movable through the flange 100 of lever 96, having a head 101 at its free end. Rod 99 is also provided with a spring 102, which operates between the shoulder 103 and washer 104, which is movable upon said rod. Upon the forward movement of the keyboard the washer 104 comes in contact with the projection 100 of lever 96, after which the compression of spring 102 begins. Upon the shoulder 103 is also provided the projection 105. Connected with the catch 95 is the projection 106. Upon the forward movement of the carriage and after spring 102 has begun to be compressed the projection 105 encounters projection 106 of catch 95 to cause the release of lever 96, so that the same will respond to the pressure of spring 102.

Lever 96 is connected by bar 107 with the T-shaped lever 108, which is rigidly mounted on rotatable shaft 91, which also carries the bell-cranks 90. The movement of lever 96 in response to spring 102 is communicated through the T-lever 108 and shaft 91 to the bell-crank 90 to cause the downward blow of the type-bar. The return of the keyboard to the initial position brings the flanged head 101 of the bar 99 against the flange 100 of lever 96 to return the lever to the vertical position and in engagement with the catch 95, which causes the rising of the type-bars for the next stroke.

Shaft 109 has a rotary movement in the framework of the machine. (See Fig. $3^a$.) The catch 95 is loosely journaled on said shaft and has a free rotary movement on said shaft. Loosely journaled on the same shaft and lying beside catch 95 is the catch 110, which is adapted also to engage with the flange 100 of lever 96. Catch 110 has rigidly secured to it the hub 111, which is loosely journaled on the shaft. This hub is provided with a slot 112, through which projects the pin 113 from shaft 109. This slot or aperture 112 is of such dimension as to permit the rotary movement of the shaft to be slightly under half a revolution. Secured to the outer end of the shaft 109 and rigid therewith is the ball-lever 114, the purpose of which is to throw the catch 110 into and out of engagement with the flange 100 of lever 96 in the following way:

When the lever is in the position pointing toward the keyboard, as shown in Fig. 3, the pin 113 is engaging with the hub 111 on the left-hand extension of aperture 112, and thereby causing the lifting of lever 110 out of engagement with the flange 100 of lever 96, said ball member being held in approximately a horizontal position by the engagement of catch 110 against the projection of the frame. When, however, the ball-lever is thrown into the opposite horizontal position—that is, pointing away from the keyboard end of the machine—the pin 113 has come in contact with the hub at the other extension of the recess 112 and causes the depression of catch 110 to engage with flange 100 of lever 96. When the catch 110 is held in the position last described—that is, in engagement with lever 96—said lever will be unable to respond to the action of spring 102 when catch 95 is raised, and thus the operation of printing is prevented. When, however, the ball-lever is thrown in position, as shown in Fig. 3, and the catch 110 is held clear of flange 100 of lever 96, it will be obvious that lever 96 will be able to respond to the action of spring 102 when catch 95 is raised out of engagement with flange 100 to permit the printing operation above described. It will thus be seen that depending upon the position of the ball-lever it is possible to operate the machine with or without having the type-bars operated, as may be desired.

*Keyboard*, (Figs. 1, 2, 8, and 9.)—The keyboard is provided with a series of sets of keys mounted upon the stems 3. These stems 3 project through apertures in three horizontal partitions, one above the other. The upper partition serves to encounter the under side of the key and limit its downward movement. The middle partition is composed of two members or plates having corresponding apertures for the insertion therethrough of the stems 3, after which the lower plate is shifted, so as to coöperate with the upper plate in leaving only an aperture for the square or smaller portion of the stem, thereby locking the stem, so that only its square portion will be movable through the plates. The projection $3^a$ serves to engage with the plate 14 to limit the upward movement of the keys and also when depressed coöperates with the spring-actuated catch-bar 115 to hold the key in the depressed position until released. The lower partition serves as an additional guide for the stems 3. The spring-actuated members 115 are pivoted at 116 to the framework and are controlled by springs 117. Each member 115 is adapted to coöperate with a whole set of keys. It will be seen that where the wrong key has been depressed and caught by catch 115 by depressing the proper key in the same set the catch will be operated to automatically release the wrong key in the same set. The release or locking bar 118 has a longitudinal movement across the keyboard, being supported in slots in the frame of the said keyboard at either side. This member is provided with evenly-disposed lugs 119, which are adapted to encounter the spring-actuated catches or locking members 115 to cause them to release the keys by the shifting of said member 118. This member 118 is adapted to operate all of the locking members 115 at the same time, thus releasing all the keys that may be depressed. Said member 118 is manually operated by the spring-controlled push-rod 9 when the keyboard is in the initial position. After the necessary or desired number of keys are depressed and the keyboard is moved forward the end of the release-bar 118 encounters incline wall 120 of the recess 121, into which the release-rod normally projects. This incline causes the shifting to the left of member 118, causing the lugs 119 to be carried over against the locking members 115 to prevent the movement of the same while said bar 118 is in said position. The purpose of this is to prevent the depression or operation of any key after beginning the forward or registering stroke of the keyboard. Upon the return of the keyboard the opposite or left-hand extremity of the releasing-bar 118 comes in contact with the pawl 122, (see Fig. 6,) the cam-face 123 of said bar 118 coöperating with the pawl to cause the sliding movement of the bar from the left to the right, causing the lugs 119 to engage the catches or locking members 115 to cause the release of all the keys.

It will be noticed that pawl 122, as shown in Fig. 6, is pivoted at 124 and has upon its left hand a fixed projection of the frame. This arrangement, it will be seen, permits the movement of the keyboard in the forward or registering direction with the releasing member projecting against the pawl. Said registering member, held in the locked position, as above described, will simply push the pawl away and ride under it, while in the return movement of the keyboard the locking or releasing member 118 encounters the pawl, which is held rigid by the projection 125 and is thereby caused to shift to the right or releasing position. It may be noted here that this is the normal action of the pawl in the ordinary process of addition. When, however, other computations are to be made in connection with the indicator, hereinafter to be described, the pawl has an additional function therewith.

*Governor*, (Figs. 13, 14, and $14^a$.)—In case it should be desirable to provide an automatic speed-governing mechanism in connection with the reciprocation of the keyboard we have provided the following device: Secured to the lower part of the side frames is the cross member 126. Upon this is mounted the shaft 127, suitably journaled at 128 and passing through the quill 130, which is journaled at 129. Secured at one end of the quill is the yoke 131 for carrying the ends of the toggle-levers 132 and $132^a$. This yoke is provided on its inner face with a ratchet, as shown in Fig. $14^a$. Mounted also upon the quill is the pinion 134, which has a coöperating ratchet carrying also a face-ratchet to coöperate with yoke 131. Within a recess of the pinion 134 is the spring 135 for normally maintaining the ratchet in engagement. Secured between the toggle-levers 132, $132^a$, 133, and $133^a$ are the weights 136. The other extremities of the toggles 133 and $133^a$ are secured to a yoke 137, which is rigid with the rotating shaft 127. The spring 140, surrounding shaft 127 and bearing between the yoke 137 and the yoke 131, is adapted to maintain the yoke 137 in the normal position, as shown in Fig. 14. Secured to and movable with the keyboard is the rack 138, which is adapted to coöperate with the pinion 134, and also secured to and movable with the keyboard is the lock-bar or notch-bar 139. The said rack 138 and the lock-bar 139, which are secured to the keyboard and movable therewith, are suitably supported, guided, and separated by lugs or projections secured to the cross-piece 126. The operation of the keyboard will consequently cause the rotation of the pinion, which moves therewith and which is meshed with the rack, and will thereby cause the consequent rotation of the weighted toggles which act on the well-known principle of the fly-ball governor, the adjustment of which is regulated by the tension of spring 140. The connection between the pinion and the fly-ball mechanism is maintained by the spring-pressed ratchet-faces in pinion 134 and yoke 131, said ratchet being a one-direction clutch so arranged that upon the forward movement of the carriage there is a positive connection between the pinion and the fly-ball mechanism. Upon the return of the carriage and the consequent opposite-directional movement of the pinion the fly-ball mechanism is permitted to continue its original direction of movement, there being a free disengagement of said ratchet-faces.

It is obvious that upon a maximum or abnormal speed of reciprocation of the carriage a consequent speed is communicated to the fly-ball mechanism to cause the centrifugal movement of the same and the consequent shifting of the yoke 137, which causes the shaft 127 to project through the quill into one of the notches 141 of the lock-bar 139, which arrests said reciprocating movement of the keyboard.

It is obvious that upon the arrest of the movement of the keyboard the fly-balls will almost instantly resume their normal position and release the shaft 127 from engagement with one of the notches 141, and so permit the reciprocation of the keyboard to continue.

The adjustment of this governor device will depend upon the force of spring element 140, and by experimentation may be ascertained the spring-power necessary to resist the outward movement of the fly-balls sufficiently to cause the engagement of shaft 127 with the lock-bar 139 for all normal speeds of reciprocation of the keyboard.

*Total-lever*, (Fig. 2.)—In the above description we have shown the mechanism for indicating on the dial-wheels the numerals corresponding to the keys depressed and for carrying from one dial-wheel to another the multiples of ten. We have also described and shown the mechanism for operating the type-bars for printing in accordance with the keys depressed. The following mechanism is provided for printing the totals and subtotals of all the keys depressed. In printing the total we depress the keys corresponding to the numerals shown on the dials. We then press the lever 143, which is marked "Total-lever" and which is pivoted to the framework at 144 and has a forked engagement with the cross-bar 38, which is secured to the levers 35. By pressing outwardly or downwardly this total-lever the levers 35 are operated to disengage the rack member 7 from the pinion 8 and cause the engagement of rack member 46 with pinion 8. The keyboard is then pushed or moved forward. The rack 7 being out of engagement with the pinion 8, it is therefore obvious that no movement takes place of the dial-plates in this operation. At the end of the extreme forward movement of the keyboard the type-bars, having been lined to correspond with the keys depressed, are operated to print the number indicated upon the keyboard. The total-lever is then raised or pulled back to its original position, which causes the meshing of rack 7 with the pinions and the disengagement with rack member 46. The return movement of the keyboard then returns the dials to zero.

Where it is desirable to print a subtotal, the keys are depressed, as above described, and the total-lever 143 is operated as to hold the ratchet 7 out of engagement with gear wheel or pinion 8 in both the forward and backward movements of the carriage, permitting only the action of the printing mechanism.

*Indicating device for multiplying and dividing*, (Figs. 15 to 22, inclusive.)—Secured to the outside cover of the machine, as shown in Fig. 15, is provided the indicating device, which consists of the following mechanism: 146 is the inclosing framework or case, within which is mounted a rotatable shaft 147, carrying rigid therewith the cam 148 (shown in detail in Fig. 19) and the ratchet 149. (Shown in Figs. 18 and 21.) The cam and ratchet are located within the casing 146. The top face of the casing 146 is provided with two sets of circularly-disposed numerals running from "1" to "0" in opposite directions, said sets being concentric one line within the other, the "0" of the inner set being in radial alinement with the "9" of the outer set, while the "9" of the inner set is in radial alinement with the "0" of the outer set. Superimposed upon this top plate of the casing 146 and the sets of numerals just described is the rotatable disk 150, provided with two series of ten circularly-disposed perforations, said series being concentric and one surrounded by the other, each set of said perforations being arranged to correspond with its respective set of numerals, but so that when the disk is rotated to one position it will display one set of numerals only, while the other remains covered, and when rotated to the opposite position it will cover the former set and expose to view the latter. Upon the shaft 147 and rigidly secured thereto is the pointer 151, adapted to be rotated with the shaft 147 and to lie above the perforated disk 150, so that it may be made to point to any required numeral of the exposed set of the two concentric sets above described. To the lower end of the shaft 147 is secured the spiral spring 152, the other end of which being secured to a pin 153, projecting from the casing 146. Journaled in the boss 154 of the casing 146 is the depressible shaft 155, having a spring 156 acting between the boss and a head, said spring being secured firmly at one end to the boss and at the other end to the head and serving the double function of maintaining the shaft in normal or elevated position and also maintaining by torsional action the initial or starting position of the escapement-lever 157, which is secured to the lower extremity of the shaft 155, the escapement-lever 157 being within the case 146, having its free end or tail projecting through the frame and outside cover of the machine, so that its free extremity will engage with the spring-pressed projection 158, (see Fig. 18,) which extends outwardly through the framework of the keyboard. Beneath the cam 148 is the shifting bar 156, which projects through slots on either side of the casing 146, which serves to guide the same. This shifting bar 156 is provided with the two pins 159 and 160 and a lug 161, connected with one end of the spring 162, the other end of which is connected with the framework of the casing at 163. The cam 148, which is rigidly secured to the rotating shaft 147, is provided with the notch 168 and upon its under side with the knockout-arm 167.

By rotating to the right the shaft 147 by means of the thumb-piece 169 the spiral spring 152 is wound up and is held in said wound position by the escapement-lever engagement with ratchet 149. Said rotation of shaft 147 also causes the rotation of cam 148 in the direction of the arrow shown in Fig. 19, which causes the long side of the cam-notch 168 to engage the pin 160 on shifting bar 156 to cause the movement of the shifting bar against the tension of spring 162 to the position in which the shoulder 170 shall pass the wall of the casing 146 and lock within the same. By the operation of the escapement-lever in the manner hereinafter described the rotatable shaft 147 is permitted to move in the opposite position—that is, in the direction of unwinding the spiral spring 152—causing the similar rotation of cam 148, in which rotation when the knockout-pin 167 encounters the pin 159 on the shifting bar 156 the shoulder 170 is disengaged from the wall of the casing 146, and said shifting bar is permitted to respond to the tension of spring 162 to return to the original position, as shown in Fig. 19. The escapement 157 may be instantly and entirely disengaged from the ratchet-wheel 149 by the depression of the shaft 155 to permit the ratchet to return to its original position. Upon withdrawing pressure from said shaft the said ratchet will return to engagement with the ratchet-wheel 149, suitable means, such as pin 157$^a$, being provided to guide said ratchet into said engagement against the torsional action of the spring 152. Attached at 171 to one end of the shifting bar 156 (see Figs. 1 and 15) is the connecting-rod 172, which is pivotally secured at the other end at 173 to the crank 174, which is mounted on shaft 124, to the other end of which shaft and within the framework of the machine is the pawl 122, (see Fig. 6,) hereinabove described. The purpose of this connection between the shifting bar and the pawl 122 is that when the indicator is set—that is, when the rotatable rod or shaft 147 is wound up or partially wound up against the tension of spiral spring 152—the shifting or ship bar 156 is held in such position as to maintain the pawl raised, so that it will not operate the releasing-bar 123 until the required number of reciprocations of the keyboard as set by the indicator are made to cause a sufficient escapement motion to release the shifting bar, it being noted that every reciprocation of the keyboard causes the engagement of pin 158, carried by same, with the tail of the escapement-lever 157, which causes the consequent one-tooth movement of ratchet-wheel 149 as long as the spring is under tension.

*Automatic ribbon feed and reverse in connection with printing mechanism,* (Figs. 4 and 5.)—Referring to Fig. 4, the spools 175 and 176 are rotatably mounted on the rear part of the casing. Upon these spools are wound the opposite ends of a printing-ribbon 180. The tension-springs 178 and 179 are adapted to press against the face of said spools. Keyed to these spools and rotatable therewith are the ratchet-wheels 181 and 182. Connected with the T-lever 108 is the connecting-rod 183, which is pivotally connected at its other end with the rocking plate 184. This rocking plate 184 has a pivotal movement upon the axis of the spool 176. The rod 186 is pivotally connected between the rocking member 184 and the rocking member 187, which has a rotating movement upon the axis of spool 175. Upon each of the rocking plates 184 and 187 are the spring-pressed pawls 188 and 189, adapted to engage with the ratchets 181 and 182. Slidingly mounted upon the screws 190, secured to the casing, is the member 191, having curved ends adapted to engage with the pins 192 and 193, projecting from pawls 188 and 189, respectively. Pivotally secured to the casing at 194 is the rocking lever 195, having its lower end pivotally connected at 196 with member 191. The upper end of rocking lever 195 is apertured to accommodate shaft 197, while the top extension of same is provided with faces adapted to engage with oppositely-disposed catches 198 and 199, said faces being tangent to their respective catches in the extreme positions of reciprocation of the rocking lever 195. The reciprocating shaft 197 is slidingly mounted on the projections 200. Said shaft 197 is provided at each extremity with the rolls 201 and 202 and also the collars 203 and 204, rigidly secured to said shaft, and between said collars 203 and 204 are the loosely-mounted compression-springs 205 and 206, which operate between said collars 203 and 204 and the upper extension of the rocking lever 195. The catches 198 and 199 are mounted to the framework at 207 and 208 and are adapted to engage with the oppositely-disposed faces of the rocking member 195. The pin 209 is adapted to limit the upward movement of the catches 198 and 199 to prevent them tumbling clear over. The said catches are provided at their lower rear ends with projections 210 and 211.

The operation of the device is as follows: The rocking of lever 108, above described in connection with the printing operation, communicates through lever 183 movement to the rocking plate 184 and through lever 186 to rocking plate 187, so that with each oscillation of said T member 108 there is the consequent movement of the plates 184 and 187. The sliding member 191, the curved ends of which are adapted to encounter the pins 193 and 192 of the pawls 188 and 189, is so adjusted that in one position it will maintain pawl 188 out of engagement with ratchet 181, while it permits pawl 189 to engage with ratchet 182, this being the position shown in Fig. 5. In this position the oscillation of the rocking plates 184 and 187 causes the actuation of ratchet 192 through pawl 189 to cause the winding of the ribbon 180 in the direction of the arrow shown in Fig. 4 when the ribbon has become wound upon spool 175 to a sufficient diameter, so that the circumference of its body will bear against roll 201 sufficient to shift the rod 197 toward roller 176, causing the pressure of shoulder 203 to press spring 205 against the rocking lever 195, which is held in engagement with catch 198 until the shoulder 203 encounters the projection 210 of catch 198 to cause the release of rocking member 195, which responds to the pressure of the compressed spring 205, causing the shifting of member 191 so that the same will impinge 193 to throw pawl 199 out of engagement with ratchet 182 and will withdraw its engagement from pin 192 to permit pawl 198 to engage with ratchet 181, so that the oscillation of the rocking plates 184 will now cause the movement of roller 176 to shift the winding of the ribbon from roller 175 to roller 176 in a direction opposite to that indicated by the arrow in Fig. 4. Thus it will be seen that an automatic shifting of direction of ribbon-feed is accomplished by the ribbon and its bearing against rollers 201 and 202, respectively, when a sufficient amount becomes stored upon the respective spools and a constant motion of the ribbon is maintained by each printing operation of the type-bars.

*Paper-feed*, (Figs. 11 and 12.)—By the same rocking movement of T-lever 108 motion is communicated through the pawl 102, which coöperates with the ratchet 213 on the shaft 214, which carries a roller 215, which is adapted to coöperate with the spring-compressed tension-roller 216, between which and roller 215 the paper is fed around and over roller 215, being suitably guided in the proper position to receive the impact of the type-bars through the ribbon 180. Shaft 214 is also provided with the knurled knob for the manual operation of the roller 215. Mounted on suitable framework in front of the roller or beyond the roller 215 is the toothed or serrated bar 218 for facilitating the separation of the portion of the paper printed, and a suitable shield 219 is also provided beyond the toothed bar for throwing up or directing upwardly the paper, so that it may clear the roll and be accessible.

The operation of our device is as follows: First, before beginning to operate the device if there are any figures visible on the dial-wheel other than zero they should all be brought to zero in the following manner: As to the black numerals, throwing the ball-lever 114 into the position in which the machine will not print and bringing the hand-lever 81 into the lower vertical position, the keys corresponding with the figures other than zero shown on the dial-wheels should be depressed. The total-lever 143 is then depressed or pushed in the direction away from the keyboard. The hand-lever 81 is then given a half-revolution—that is, from the lower vertical to the upper vertical position. The lever 143 is then pulled upward to the limit of its movement toward the keyboard and the revolution of hand-lever 81 is completed, or, with respect to the red numerals, on the dial-wheels the keys are depressed corresponding to the numerals shown on the dials and the hand-lever given a full rotation. This will return the keyboard to initial position and the dial-wheels all to zero. The machine is now in condition for the various operations for which it is adapted.

*Adding.*—The sliding member 228 above the dial-plate is moved to the position which causes the exposure of the black numerals only. The keys representing one line of figures are depressed. The hand-lever is then given one complete revolution, the depressed keys thereby being released and the dials being moved to indicate the numerals corresponding to the keys depressed. The keys corresponding with the second line of the column to be added are then depressed and the hand-lever again moved a revolution, and so on until the entire column has been registered on the dial-wheels. After the keys representing the last line of the column have been depressed and the hand-lever rotated the dials will indicate the total of the column. By giving the hand-lever an idle rotation without depressing the keys a space is left between the column and the total to be added thereto. The keys are then depressed to correspond to the figures represented on the dials. The total-lever 143 is then depressed in the direction away from the keyboard, and the hand-lever 81 is given a half-revolution—that is, from the lower vertical position to the upper vertical position. The total-lever is then pulled forward or toward the keyboard while the balance of the revolution of the hand-lever is made. This returns the keyboard to the initial position and the dial-wheels to zero, and at the same time prints the total in the manner and by the mechanism above described—that is, it being understood that the ball-lever 114 is in the operative position.

*Multiplication.*—In the operation of multiplication the black numerals on the dial-plates are still visible. The multiplicand may be printed upon the paper slip and also the multiplier without registering the same on the dial-wheels by first depressing the keys representing the multiplicand, having the ball-lever 114 in the printing position, and rotating the hand-lever 81, with the total-lever depressed throughout the rotation of said hand-lever, and then depressing the keys representing the multiplier and again rotating the hand-lever while the total-lever is depressed in the manner above explained. An idle revolution of the hand-lever may then be made for space, and the ball-lever 114 is thrown into the non-printing position. Where the multiplier is, for instance, "75," we depress the keys representing the multiplicand so that the last figure of the same is in the column corresponding to the position of the figure of the multiplier to be used. We then turn the knurled head or thumb-piece 169 of the indicator device until the arrow points to the first figure of the multiplier—namely "5"—upon the numerals shown through perforated disk 150, when it is in the multiplication position. The hand-lever 81 is then rotated until the keys depressed are released. The keys representing the multiplicand are again depressed on the keyboard, but this time one column to the left. The knurled head 169 is again turned until the arrow incates or points to the second figure of the multiplier—namely "7"—upon the figure showing through the perforated disk 150, and the hand-lever 81 is again rotated until the keys are released. The dial-plates will now show the product of the multiplication, which may be printed by depressing the corresponding keys of the keyboard and depressing the total-lever while the hand-lever 81 is moved a half a revolution and then elevating the total-lever while the revolution of the hand-lever is completed, when the total will be printed on the paper slip and the dial-plates returned to zero.

*Subtraction.*—First move the member 228 to display the red numerals on dial-wheels and bring all the dial-wheels to zero with respect to the red numerals in the following way: Depress keys corresponding to all the numerals displayed on dial-wheels not showing zero and then give one full rotation of the hand-lever, which will bring all the dials to zero. Then, having the ball-lever 114 in the printing position, depress keys representing the minuend. Press the total-lever outward during the first half-revolution of the hand-crank 81 and then draw the total-lever upwardly during the last half of the revolution, which will bring the red figures on the dials, which will cause the printing of the subtrahend and indicating the same on the red wheels of the dial. Then depress the numerals indicating the subtrahend and give one full revolution of the hand-lever 81 without touching the total-lever, and the same will be printed beneath the subtrahend, while the result will be indicated on the dial-wheels. Depress the keys representing the result and give another full rotation of the hand-lever 81, and the same will be printed.

*Division.*—In the operation of division the red numerals on the dial-wheels are displayed, as above described, for subtraction. Take, for instance, "975" to be divided by "25." We first print and register the dividend "975" and then print without registering in the manner above described the divisor, after which we make an idle revolution of the hand-lever 81 for space. Then after reversing the position of the ball-lever 114 we depress the keys representing the divisor in each instance, so that the first figure of the divisor will be in the same column as the first figure of the original or subsequently-decreased dividends, when the same number of figures of the dividend indicate an amount equal to or exceeding the amount of the divisor, or one column to the right of the first figure of the dividend when the divisor exceeds the amount indicated by a like number of figures of the dividend in the second and third columns upon the keyboard. We turn the knurled knob 169 to the right until the arrow indicates "0" in circle of numerals appearing through the perforated disk 150 when moved into the position indicated for division. The hand-lever 81 is then operated until the dials representing the second and third columns of figures register an amount less than the divisor, when the arrow will indicate the first figure of the quotient, which, after the keys have been released and the arrow indicates the digit "9," may be printed but not registered in the second column. Next we depress the keys representing the divisor upon the keyboard in the first and second columns, turning the knurled knob 169 to the right until the arrow indicates "0." The hand-lever 81 is again operated until zero is registered, when the arrow or pointer 151 will indicate the second and last figure of the quotient, which may be printed but not registered in the first column. The quotient in this instance is "39" and is always read diagonally, thus:

975
25
3∅
∅9

What is claimed is—

1. In an adding-machine, the combination of a frame, a movable keyboard mounted to reciprocate therein, a slotted member depending from said keyboard, a crank-shaft journaled in said frame, and a crank, having a box sliding in said slotted member, whereby said keyboard is reciprocated.

2. A reciprocating keyboard, a rotary shaft for reciprocating said keyboard, having sliding-box connection therewith and means for preventing backward motion of said shaft.

3. A reciprocating keyboard, a rotating hand-crank having sliding-box connection therewith, and disengageable means for preventing the backward movement of the hand-crank.

4. A keyboard having a horizontal reciprocative movement provided with a series of sets of depressible keys, a series of dial-wheels, means for communicating movement from the keys to the dial-wheels, a rotating hand-lever for causing the reciprocative movement of the keyboard, and a sliding-box connection between the keyboard and hand-lever.

5. A reciprocating keyboard, a rotating hand-crank having a sliding-box connection therewith and means for normally preventing backward motion of the crank.

6. A keyboard having a horizontal reciprocative movement provided with a series of sets of depressible keys, a series of dial-wheels, means for communicating movement from the keys to the dial-wheels, a rotating hand-lever for causing the reciprocative movement of the keyboard and mechanism for normally insuring the full movement in one direction of the keyboard before its return to the initial position, a casing for the machine and manually-operative means without the casing and within reach of the operator for rendering the last-described mechanism inoperative.

7. In a machine of the class described, a train of mechanism for operating said machine comprising a reciprocating member, a crank-shaft and crank for reciprocating said member, whereby a slight variation of the crank from normal position has little or no effect on the reciprocating member, a casing for the machine and manually disengageable means without the casing for normally preventing backward rotation of said shaft.

8. In a calculating-machine the combination of a movable keyboard provided with depressible keys, a series of dial-wheels, each provided with a single pinion, a series of step-bars operated by the keys, each step-bar provided with a type-bar, a rack-bar adapted to coöperate between the step-bar and the pinion for communicating motion to the dial-wheels, the connection between the step-bar and the rack being a lost-motion connection, and cam-and-pawl means for insuring the preliminary movement of the step-bar before permitting the movement of the rack-bar.

9. A key having a contracted portion, a fixed double guide-plate for said contracted portion composed of two members having openings through which the key passes, said members in the process of manufacture being shifted relatively to one another to contract the opening.

10. A keyboard having a horizontal reciprocative movement provided with a series of sets of independently-operated depressible keys, a series of step-bars to coöperate with the keys, each step-bar provided with a type-bar, a transversely-movable member provided with a series of evenly-disposed projections and another series of projections of gradually-increasing distance one from the other, so arranged and operated as to encounter and carry forward the step-bars and the type-bars connected therewith corresponding to the columns in which zero should be indicated.

11. A keyboard having a horizontal reciprocative movement provided with a series of sets of independently-movable depressible keys, a series of dial-wheels, a series of step-bars to coöperate with the keys and a series of racks for communicating movement from the keys and step-bars to the dial-wheels and means for automatically disengaging the racks from the dial-wheels at the end of the forward stroke of the keyboard.

12. A keyboard having a horizontal reciprocative movement provided with a series of sets of independently-movable depressible keys, a series of dial-wheels, a series of step-bars to coöperate with the keys and a series of racks for communicating movement from the keys and step-bars to the dial-wheels and means for automatically disengaging the racks from the dial-wheels at the end of the forward stroke of the keyboard with manually-operative means for preventing said automatic disengagement.

13. A keyboard having a horizontal reciprocative movement provided with independently-movable depressible keys, a series of step-bars to coöperate therewith, a series of dial-wheels and a series of racks to coöperate with the step-bars to communicate movement to the said wheels and manually-operative means for arbitrarily disengaging the racks from the dial-wheels either upon the forward or rearward movement of the keyboard.

14. A movable keyboard, means for imparting to said keyboard a movement of uniform extent at each operation of the machine, a register, operated by said keyboard and means for automatically disengaging the register and its operating devices.

15. A movable keyboard provided with a series of sets of depressible keys, a series of dial-wheels provided with pinions, a series of step-bars and racks for communicating movement from the keys to the dial-wheels, means for automatically disengaging the rack-and-pinion engagement at the end of the forward movement of the dial-wheels.

16. A movable keyboard provided with a series of sets of depressible keys, a series of dial-wheels provided with pinions, a series of step-bars and racks for communicating movement from the keys to the dial-wheels, means for automatically disengaging the rack-and-pinion engagement at the end of the forward movement of the dial-wheels and manually-operative means for arbitrarily preventing said automatic disengagement.

17. A movable keyboard provided with a series of sets of depressible keys, a series of dial-wheels provided with pinions, a series of step-bars and racks for communicating movement from the keys to the dial-wheels, means for automatically disengaging the rack-and-pinion engagement at the end of the forward movement of the dial-wheels, automatic means for engaging with the pinions to lock the dial-wheel upon the automatic rack-and-pinion disengagement.

18. A movable keyboard, means for imparting to said keyboard a uniform movement at each operation of the machine, a register operated by said keyboard, transfer devices for said register and means for automatically engaging and disengaging said register and its transfer devices.

19. A movable keyboard, means for imparting to said keyboard a uniform movement at each operation of the machine, a register, operated by said keyboard, transfer devices for said register and means for automatically engaging and disengaging said register and its operating and transferring devices.

20. A movable keyboard provided with a series of sets of depressible keys, a series of dial-wheels each provided with a pinion, a series of step-bars and racks for communicating movement from the keys to the dial-wheels, a projection on said dial-wheels, a series of levers, a serrated member to coöperate with the pinion of the next-above dial-wheel adapted to be actuated when the said projection passes a certain point, and means for engaging and disengaging said pinions and serrated members.

21. A movable keyboard provided with a series of sets of depressible keys, a series of dial-wheels each provided with a pinion, a series of step-bars and racks for communicating movement from the keys to the dial-wheels, and automatic means for normally causing the disengagement of the rack and pinion after the forward movement of the keyboard and for normally causing the engagement of rack and pinion after the rearward movement of the keyboard.

22. A movable keyboard, means for imparting to said keyboard a uniform movement at each operation of the machine, a register operated by said keyboard and means for automatically engaging and disengaging said register and its operating devices.

23. A reciprocating keyboard, a register, register-operating devices coöperating with said keyboard, and means for engaging said register and its operating devices at one end of the reciprocation and disengaging the same at the other.

24. A movable keyboard carrying a series of depressible keys, a register, register-operating devices actuated by the keys and transfer devices for the register operated by the movable keyboard.

25. A register, a movable keyboard coöperating therewith, and transfer mechanism for the register operated by the movable keyboard.

26. A reciprocating keyboard, a register operated by said keyboard when moving in one direction and transfer mechanism for said register operated by said keyboard when moving in the other direction.

27. In an adding-machine, a reciprocating keyboard, a register, means for operating the register upon one stroke of the reciprocating keyboard and transfer means operated upon the other stroke.

28. A series of depressible keys, means for imparting a to-and-fro motion to said series of keys, a register, means for operating said register, when the series of keys moves in one direction and transfer means for said register operated when said series of keys moves in the other direction.

29. A reciprocating keyboard having a series of sets of depressible keys, a register comprising a series of wheels, a series of racks for actuating said wheels in accordance with the keys depressed upon one stroke of said keyboard and means for disengaging the wheels and racks upon the other stroke.

30. A movable keyboard provided with a series of sets of depressible keys, a series of step-bars to coöperate with the keys, a series of racks connected with the step-bars and a series of indicating devices operated by said racks, the connection between the racks and the step-bars being a lost-motion connection and means for taking up said lost-motion connection to insure the full preliminary movement of the step-bar before permitting movement of the rack, consisting of a cam adapted to be rotated by the preliminary movement of the step-bar and to actuate a pawl having connection with the rack to cause the taking up of said lost motion in exact proportion to the preliminary movement of the step-bar.

31. A movable keyboard provided with a series of sets of depressible keys, a series of step-bars to coöperate therewith, a series of type-bars connected with the step-bars and means for storing power and releasing the same upon the forward movement of the step-bar to cause the downward stroke of the type-bar at the end of its forward movement.

32. A movable keyboard provided with a series of sets of depressible keys, a series of step-bars to coöperate therewith, a series of type-bars connected with the step-bars, means for storing power and releasing the same upon the forward movement of the step-bar to cause the downward stroke of the type-bar at the end of its forward movement, and means for securing paper to be printed upon so as to receive the impression of the character indicated by the operated type-bar.

33. A movable keyboard provided with a series of sets of depressible keys, a series of step-bars to coöperate therewith, a series of type-bars connected with the step-bars, means for storing power and releasing the same upon the forward movement of the step-bar to cause the downward stroke of the type-bar at the end of its forward movement, means for securing paper to be printed upon so as to receive the impression of the character indicated by the operated type-bar and inking means interposed between the paper and the indicated numeral of the operated type-bar.

34. A movable keyboard provided with a series of sets of depressible keys, a series of step-bars to coöperate therewith, a series of type-bars connected with the step-bars, means for storing power and releasing the same upon the forward movement of the step-bar to cause the downward stroke of the type-bar at the end of its forward movement and springs interposed between the respective type-bars for the purpose of introducing friction therebetween.

35. In combination with step-bar and serrated bar having lost-motion engagement with each other, means for positively preventing the movement of the serrated bar, until the step-bar has made a sufficient initial movement to take up the lost motion between it and the serrated bar.

36. In an adding-machine the combination of a series of sets of depressible keys, a series of type-bars corresponding therewith and means independent of the keys for raising and tripping the type-bars.

37. A register and a type-carrier having a lost-motion connection and means for positively taking up the lost motion.

38. The combination of a series of adjustable type-carriers having type for printing numerals, but normally adjusted not to print, a series of registering devices, a series of register-operating devices and means for positively preventing the movement of any register-operating device until the corresponding type-carrier has first been adjusted to print zero.

39. The combination of the coöperating members 4 and 5 having lost-motion connection 6, the connecting-link 5ª the lever 4ᵈ and the cam 4ª coöperating with said lever.

40. The combination of a reciprocating keyboard provided with a series of sets of keys, a series of step-bars each provided with a series of steps so arranged with respect to the key-stems that each key of a set when depressed will cause a different movement of the step-bar upon the reciprocation of the keyboard and a member carried by the keyboard for engagement with the step-bars upon the return of the keyboard to initial position to restore the alinement of step-bars in initial position.

41. The combination of a series of register-wheels, pinions connected with said wheels, reciprocating racks for actuating said pinions, spring means for engaging and disengaging said racks and pinions and an operating mechanism for storing power in said spring means during part of the movement of said mechanism for engaging said racks and pinions and during another part for disengaging the same.

42. A movable keyboard provided with a series of sets of depressible keys, a series of step-bars for coöperating therewith and for communicating movement to a registering mechanism, said step-bars having a lost-motion connection with said registering mechanism and means controlled by the operation of the keys for permitting a preliminary movement of the step-bar necessary to cause the printing of the zeros indicated and means for positively taking up the lost motion.

43. The combination of a series of register-wheels, pinions connected to said wheels, reciprocating racks for actuating said pinions, spring means for engaging and disengaging said racks and pinions, and a reciprocating operating mechanism for storing power in said spring means during one stroke of said mechanism for engaging said racks and pinions and during the other stroke for disengaging the same.

44. The combination of a series of registering-pinions, a series of racks for actuating said pinions, a frame for moving said racks into and out of engagement with said pinions, spring means for moving said frame and an operating mechanism for storing power in said spring means.

45. The combination of a series of registering-pinions, a series of racks for actuating said pinions, a frame for moving said racks into and out of engagement with said pinions, spring means for moving said frame, an operating mechanism for storing power in said spring means, a lug on said frame and a reciprocating rib for holding said frame in one position during one stroke of said rib and in the other position during the other stroke.

46. A series of registering-pinions, a series of racks for actuating said pinions, means for engaging and disengaging said racks and pinions, spring devices for actuating said means, a reciprocating keyboard for storing up power in said devices during one stroke to cause the engagement of said racks and pinions and during the other stroke to cause the disengagement of the same and means for positively holding said means in adjusting position during each stroke.

47. A register-operating device and a type-carrier having lost-motion connection, and means connecting said operating device and type-carrier and operating to positively take up the lost motion.

48. The combination of a series of register-wheels, a series of rack-bars for operating said wheels, means for moving said rack-bars into and out of engagement with said wheels, transfer devices a frame for moving said transfer devices into and out of engagement with said wheels and a connection between said means and said frame.

49. The combination of a series of register devices, a series of racks for operating said devices supported in a movable frame, a series of transfer devices also supported in a movable frame and means for causing said frames to move together.

50. The combination of a series of registering devices, a series of register-operating devices movable into and out of operative position, transfer devices movable into and out of operative position and connections for causing said operating devices and transferring devices to move simultaneously.

51. A reciprocating keyboard, a slotted arm depending therefrom, a crank having sliding-box connection with said arm, a shaft for said crank extending to the side of the machine, a hand-crank, and gearing connecting said shaft and hand-crank.

52. A reciprocating keyboard, a frame having a ball-bearing support for said keyboard, a slotted arm depending from said keyboard, a crank having a sliding-box connection with said arm, a shaft for said crank extending to the side of the machine, and a hand-crank geared to said shaft.

53. The combination of a register, a series of operating devices therefor, a series of spring-pressed type-bars, means for raising and latching said type-bars, means for tripping said latching means, and a manually-adjustable latch to prevent printing if desired.

54. A series of type-bars, a movable keyboard having a series of sets of keys for adjusting said type-bars, a spring, connections for storing power in said spring by the movement of the keyboard, and means whereby said spring depresses the type-bars when they are adjusted.

55. A reciprocative keyboard provided with a series of sets of depressible keys, a series of step-bars to coöperate therewith and a series of type-bars connected with the step-bars and reciprocated thereby, spring means connected with the mechanism supporting the type-bar and means for storing power in said spring means during the forward movement of the type-bar and means for releasing the type-bar to respond to the spring means at the end of said forward movement.

56. A series of registering-pinions, a series of rack-bars for operating said pinions, a frame supporting said rack-bars, a reciprocating keyboard, spring devices put under tension by said keyboard to raise and lower said frame, a lug on said frame and a rib reciprocated by said keyboard and passing under or over said lug to hold the racks into or out of engagement with said pinions.

57. A reciprocative keyboard provided with a series of sets of depressible keys, a series of step-bars to coöperate therewith, a series of type-bars connected with the step-bars and reciprocated thereby, means for normally causing the downward movement of the actuated type-bars at the end of the forward movement of the keyboard and means for arbitrarily preventing this downward movement.

58. A reciprocative keyboard provided with a series of sets of depressible keys, a series of step-bars connected therewith and a series of type-bars connected with the step-bars and reciprocated thereby, means for normally projecting the actuated type-bars against the paper to be printed upon at the end of the forward movement of the keyboard and means for arbitrarily preventing this printing action during the reciprocation of the keyboard.

59. A movable keyboard provided with a series of sets of depressible keys mounted upon stems having approximately square intermediate parts and a shoulder at its lower extremity, said keyboard provided with a plurality of approximately parallel partitions, the upper partition serving to encounter the under side of the key and limit its downward movement, the next partition composed of two members or plates having corresponding apertures for the insertion therethrough of the stems after which the lower plate is shifted so as to coöperate with the upper plate leaving only an aperture for a square or smaller portion of the stem thereby locking the same so that only its square portion will be movable through the plates, the shoulder of the stem engaging with the lower side thereof.

60. A movable keyboard provided with a series of sets of depressible keys mounted upon stems having approximately square intermediate parts and a shoulder at its lower extremity, said keyboard provided with a plurality of approximately parallel partitions, the upper partition serving to encounter the under side of the key and limit its downward movement, the next partition composed of two members or plates having corresponding apertures for the insertion therethrough of the stems after which the lower plate is shifted so as to coöperate with the upper plate leaving only an aperture for a square or smaller portion of the stem thereby locking the same so that only its square portion will be movable through the plates, the shoulder of the stem engaging with the lower side thereof and spring means for maintaining the keys in the elevated position.

61. A movable keyboard provided with a series of sets of depressible keys mounted upon stems having approximately square intermediate parts and a shoulder or projection at its lower extremity, said keyboard provided with a plurality of approximately parallel partitions, the upper partition serving to encounter the under side of the key and limit its downward movement, the next partition composed of two members or plates having corresponding apertures for the insertion therethrough of the stems after which the lower plate is shifted so as to coöperate with the upper plate leaving only an aperture for a square or smaller portion of the stem thereby locking the same so that only its square portion will be movable through the plates, the shoulder of the stem engaging with the lower side thereof, spring means for maintaining the keys in the elevated position, and a spring-actuated member for each set of keys adapted to engage the projections of the keys when the same are depressed.

62. A movable keyboard provided with a series of sets of depressible keys mounted upon stems having approximately square intermediate parts and a shoulder or projection at its lower extremity, said keyboard provided with a plurality of approximately parallel partitions, the upper partition serving to encounter the under side of the key and limit its downward movement, the next partition composed of two members or plates having corresponding apertures for the insertion therethrough of the stems after which the lower plate is shifted so as to coöperate with the upper plate leaving only an aperture for a square or smaller portion of the stem thereby locking the same so that only its square portion will be movable through the plates, the shoulder of the stem engaging with the lower side thereof, spring means for maintaining the keys in the elevated position, a spring-actuated member for each set of keys adapted to engage the projections of the keys when the same are depressed and manually operative means for causing the disengagement and release of the depressed keys.

63. A movable keyboard provided with a series of sets of depressible keys mounted upon stems having approximately square intermediate parts and a shoulder or projection at its lower extremity, said keyboard provided with a plurality of approximately parallel partitions, the upper partition serving to encounter the under side of the key and limit its downward movement, the next partition composed of two members or plates having corresponding apertures for the insertion therethrough of the stems after which the lower plate is shifted so as to coöperate with the upper plate leaving only an aperture for a square or smaller portion of the stem thereby locking the same so that only its square portion will be movable through the plates, the shoulder of the stem engaging with the lower side thereof, spring means for maintaining the keys in the elevated position, a spring-actuated member for each set of keys adapted to engage the projections of the keys when the same are depressed and automatic means for causing the release of the keys upon the reciprocation of the keyboard.

64. A movable keyboard provided with a series of sets of depressible keys mounted upon stems having approximately square intermediate parts and a shoulder or projection at its lower extremity, said keyboard provided with a plurality of approximately parallel partitions, the upper partition serving to encounter the under side of the key and limit its downward movement, the next partition composed of two members or plates having corresponding apertures for the insertion therethrough of the stems after which the lower plate is shifted so as to coöperate with the upper plate leaving only an aperture for a square or smaller portion of the stem thereby locking the same so that only its square portion will be movable through the plates, the shoulder of the stem engaging with the lower side thereof, spring means for maintaining the keys in the elevated position, a spring-actuated member for each set of keys adapted to engage the projections of the keys when the same are depressed so arranged and adapted that the depression of one key of a set will release any key formerly depressed.

65. A movable keyboard provided with a series of sets of depressible keys mounted upon stems having approximately square intermediate parts and a shoulder or projection at its lower extremity, said keyboard provided with a plurality of approximately parallel partitions, the upper partition serving to encounter the under side of the key and limit its downward movement, the next partition composed of two members or plates having corresponding apertures for the insertion therethrough of the stems after which the lower plate is shifted so as to coöperate with the upper plate leaving only an aperture for a square or smaller portion of the stem thereby locking the same so that only its smaller portion will be movable through the plates, the shoulder of the stem engaging with the lower side thereof, spring means for maintaining the keys in the elevated position, a spring-actuated member for each set of keys adapted to engage the projections of the keys when the same are depressed and automatic means for causing the release of the keys upon the return of the keyboard after its full forward movement.

66. A register, register-operating devices, spring means for bringing said register and operating devices into and out of engagement and manually-operable means for disengaging said register and operating devices against the tension of said spring.

67. A register, register-operating devices, spring means for bringing said register and operating devices into and out of engagement, manually-operable means for disengaging said register and operating devices against the tension of said spring at the beginning of an operation of the machine and means for holding said register and operating devices in disengaged relation during the operation of the machine.

68. A register, operating devices therefor, means for printing the amounts added on said register, spring means for bringing said register and its operating devices into and out of engagement and manually-operable means for disengaging said parts against the tension of said spring.

69. The combination of a register, operating devices therefor, spring means for disengaging said register and operating devices and manually-operable means for engaging said parts against the tension of said spring.

70. A reciprocating keyboard provided with a series of sets of depressible keys, indicating devices operated thereby, manually-operative means for reciprocating the keyboard, an automatic speed-governing mechanism for controlling the speed of the reciprocation of the keyboard consisting of spring-controlled fly-ball toggle-levers and a rod actuated thereby for locking the keyboard with a stationary frame upon abnormal speed of reciprocation of the keyboard.

71. In a calculating-machine the combination of a reciprocative keyboard provided with a series of sets of depressible keys, indicating devices operated thereby, manually-operative means for reciprocating the keyboard, an automatic speed control for said reciprocation consisting of means for locking the keyboard against the reciprocation and a fly-ball governor adapted to be rotated in one direction only by the reciprocation of the keyboard and upon attaining abnormal speed to actuate the locking mechanism.

72. In a calculating-machine the combination of a reciprocative keyboard provided with a series of sets of depressible keys, indicating devices operated thereby, manually-operative means for reciprocating the keyboard, an automatic speed control for said reciprocation consisting of means for locking the keyboard against the reciprocation, and a spring-controlled fly-ball governor adapted to be rotated in one direction only by the reciprocation of the keyboard and, upon attaining abnormal speed, to actuate the locking mechanism.

73. In a calculating-machine the combination of a reciprocative keyboard provided with a series of sets of depressible keys, indicating devices operated thereby, manually-operative means for reciprocating the keyboard, an automatic speed control for said reciprocation, consisting of means for locking the keyboard against the reciprocation, and a fly-ball governor having a one-way ratchet connection with a pinion operated by the reciprocation of the keyboard to cause the rotation of the said governor in one direction only and means connected with the said governor for operating the locking means upon abnormal speed of the governor.

74. In a calculating-machine the combination of a reciprocative keyboard provided with a series of sets of depressible keys, indicating devices operated thereby, manually-operative means for reciprocating the keyboard, an automatic speed control for said reciprocation consisting of means for locking the keyboard against the reciprocation a fly-ball governor having a one-way ratchet connection with a pinion operated by the reciprocation of the keyboard to cause the rotation of the said governor in one direction only, means connected with the said governor for operating the locking means upon abnormal speed of the governor and automatic means for returning the governor to normal and releasing the locking means immediately upon cessation of reciprocation.

75. In combination with a reciprocative keyboard for a calculating-machine and means for reciprocating the same, a recessed member carried by said keyboard, a reciprocative rod supported by the stationary framework of the machine, a spring-controlled fly-ball governor rotated in one direction only by the reciprocation of the keyboard and connected with the reciprocative rod for causing said rod to engage with recessed member of the keyboard when the fly-balls attain abnormal speed.

76. In a calculating-machine the combination of a reciprocative keyboard and means for reciprocating the same, a reciprocative rod movable transversely the direction of the keyboard movement and a centrifugal governor mechanism rotated in one direction only by the reciprocation of the keyboard for actuating the reciprocative rod to engage and lock with the keyboard upon said governor attaining abnormal speed of rotation.

77. In a calculating-machine the combination of a reciprocative keyboard provided with a series of sets of depressible keys, a series of indicating devices, rack-and-pinion means for communicating movement from the keys to the indicating devices and manually-operative means for arbitrarily causing the engagement or disengagement of said rack-and-pinion elements.

78. In a calculating-machine the combination of a reciprocative keyboard, a series of sets of depressible keys, a series of indicating devices, rack-and-pinion means for communicating movement from the keys to the indicating devices, a series of type-bars also operated by said keys and manually-operative means for disengaging the rack-and-pinion means to operate the type-bars for printing without operating the indicating means.

79. In a calculating-machine, the combination of a reciprocative keyboard, a series of sets of depressible keys, a series of indicating devices, rack-and-pinion means for communicating movement from the keys to the indicating devices and a hand-operated lever for arbitrarily causing engagement or disengagement of the rack-and-pinion means.

80. In a calculating-machine the combination of a reciprocative keyboard, a series of sets of depressible keys, a series of indicating devices, rack-and-pinion means for communicating movement from the keys to the indicating devices and manually-operative means for causing the engagement or disengagement of the rack-and-pinion means either in the forward or rearward movement of the keyboard.

81. In a calculating-machine the combination of a reciprocative keyboard, a series of sets of depressible keys, a series of indicating devices, rack-and-pinion means for communicating movement from the keys to the indicating devices, a pivoted frame for supporting the rack, and manually-operative means for moving the frame to cause the engagement or disengagement of the rack and pinion, as desired.

82. A series of registering-wheels having numerals thereon, operating devices for said wheels, spring means normally acting to cause the engagement of said wheels and operating means at such time that the operation will result in turning the wheels in a direction to diminish the amount indicated by said wheels and manually-operable means for causing the engagement of said wheels and operating devices against the tension of said spring means at such a time as to cause the operation of the machine to result in increasing the amount indicated on said wheels.

83. In a calculating-machine the combination of a reciprocative keyboard provided with a series of sets of depressible keys, means for automatically locking the keys when depressed, cam-and-pawl means for releasing the locking means upon the return of the keyboard and adjustable means including a ratchet and an escapement-lever operated by the reciprocations of the keyboard for preventing the operation of the cam-and-pawl means during a predetermined number of reciprocations of the keyboard.

84. In a calculating-machine the combination of a reciprocative keyboard provided with a series of sets of depressible keys, means for automatically locking keys when depressed, cam-and-pawl means for releasing the locking means upon the return of the keyboard and adjustable means for preventing the operation of the cam-and-pawl means during a predetermined number of reciprocations of the keyboard consisting of an escapement mechanism provided with a dial and pointer, said escapement so arranged and disposed as to be operated by each reciprocation of the keyboard and means operated by said escapement means for holding the pawl in the inoperative position during the required number of reciprocations of the keyboard as indicated by means of the dial and pointer.

85. In a calculating-machine the combination of a reciprocative keyboard provided with a series of sets of depressible keys, a series of indicating devices and means for communicating movement from the keys to the indicating devices, automatic means for locking the keys when depressed, pawl-and-cam means for normally causing the release of the keys after the return of the keyboard to the forward position and adjustable means for controlling the cam-and-pawl actuation consisting of an escapement device having a pointer and dial connected therewith, said escapement device actuated by each reciprocation of the keyboard and a member actuated by said escapement actuation, connected with the pawl of the pawl-and-cam mechanism, to hold it in the inoperative position during a predetermined number of reciprocations of the keyboard.

86. In a calculating-machine the combination of a reciprocative keyboard provided with a series of sets of depressible keys, a series of indicating devices and means for communicating movement from the keys to the indicating devices, automatic means for locking the keys when depressed, pawl-and-cam means for normally causing the release of the keys after the return of the keyboard to the forward position and adjustable means for controlling the cam-and-pawl actuation consisting of an escapement device adapted to be set for a desired operation, a pointer and dial connected therewith for indicating its condition, said escapement device actuated by each reciprocation of the keyboard and a member actuated by said escapement actuation, connected with the pawl of the pawl-and-cam mechanism, to hold it in the inoperative position during a predetermined number of reciprocations of the keyboard.

87. In a calculating-machine the combination of a reciprocative keyboard provided with a series of sets of depressible keys, means for automatically locking the keys in the depressed position, a shifting bar having a cam-and-pawl actuation for causing the release of the keys upon the return of the keyboard after the forward movement, an escapement mechanism having operative connection with the pawl for holding the pawl in the inoperative position during a required number of reciprocations of the keyboard in accordance with the position to which the escapement mechanism is set.

88. In a calculating-machine the combination of a reciprocative keyboard provided with a series of sets of depressible keys, means for automatically locking the keys in the depressed position, a shifting bar having a cam-and-pawl actuation for causing the release of the keys upon the return of the keyboard after the forward movement an escapement mechanism having operative connection with the pawl for holding the pawl in the inoperative position during a required number of reciprocations of the keyboard in accordance with the position to which the escapement mechanism has been set and manually-operative means for arbitrarily releasing or unsetting the escapement mechanism.

89. In a calculating-machine the combination of a reciprocative keyboard provided with a series of sets of depressible keys, means for automatically locking the keys in the depressed position, a shifting bar having a cam- and-pawl actuation for causing the release of the keys upon the return of the keyboard after the forward movement, a spring-controlled escapement mechanism having operative connection with the pawl for holding the pawl in the inoperative position during a required number of reciprocations of the keyboard in accordance with the position to which the escapement mechanism is set.

90. In a calculating-machine the combination of a reciprocative keyboard provided with a series of sets of depressible keys, means for automatically locking the keys in the depressed position, a shifting bar having a cam- and-pawl actuation for causing the release of the keys upon the return of the keyboard after the forward movement, a mechanism including an escapement-lever and a ratchet, having operative connection with the pawl for holding the pawl in the inoperative position during a required number of reciprocations of the keyboard in accordance with the position to which the escapement mechanism is set, the escapement-lever being supported on a spring-controlled depressible shaft so that the same may be manually operated to arbitrarily disengage said lever from its coöperating ratchet.

91. The combination with an operating mechanism of a series of register - wheels, transfer devices therefor, a trip for said transfer devices, and means on one of the wheels for actuating said trip and holding it in actuated position during a considerable portion of the movement of the operating mechanism.

92. The combination with an operating mechanism of a series of registering-wheels, transfer devices for said wheels, trips for said transfer devices, means for operating the transfers that have been tripped and restoring the trips, and means for releasing the trips adapted to hold said trips in released position, during a considerable portion of the movement of the operating mechanism.

93. An operating mechanism, a series of registering-wheels, a series of transfer devices therefor normally in inoperative position, means for simultaneously operating such transfer devices as have been rendered operative, and means for rendering any transfer device operative when the corresponding wheel passes from 9 to zero, said means being adapted to hold its transfer device in operative position during a considerable portion of the movement of the operating mechanism.

94. The combination of the arm 44, the pinions 8 the rack-bars 46 pivoted to arms 44, springs 49 for moving said rack-bars to operative position, catches 47, pins 50 for tripping said catches and the bar 54 for directly engaging such arms as have been tripped to restore the same.

95. The combination of the registering-pinions 8, transfer devices therefor comprising bars 46, arms 44 to which said bars are pivoted, catches 47 for holding said bars in inoperative position, bar 54 for directly engaging such transfer devices as have been moved to operative position to restore the same and pins 50 for tripping said catches.

96. The combination of the registering-pinions 8, transfer devices therefor normally in inoperative position, means for simultaneously restoring such of said devices as have been moved to operative position, pins connected to said pinions for causing said transfer devices to be moved to operative position and for causing them to continue operative until the next operation of the machine, if necessary.

97. The combination of a series of type-carriers normally adjusted not to print, a series of operating devices therefor, a bar movable across said series of operating devices and having a series of operating projections of graduated width and a series of stops whereby said bar is stopped by the highest operating device that has been moved and the operating projections for denominations higher than the highest operated are moved to inoperative positions.

98. The combination of the type-carriers, shoulders 28 coöperating therewith, projections 20 for engaging said shoulders, stops 19, bar 18 carrying said stops and projections and slidable lengthwise to engage the stops 19 with the type-carrier of highest denomination operated, stops 20 being so graduated that only those of lower denomination remain in operative position.

99. The combination of a series of type-carriers normally adjusted not to print, a bar carrying a series of graduated projections adapted to move the type-carriers to print the significant zeros.

100. The combination of a series of type-carriers, normally adjusted not to print, a bar carrying a series of graduated projections adapted to move the type-carriers to print the significant zeros, the projection corresponding to tens being of such a length that its zero will be printed in any event.

101. A series of type-bars normally adjusted not to print, the bar 18 extending transversely of said type-bars and adjustable in accordance with the bar of highest denomination operated, means on said bar 18 to move certain of said type-bars to print the significant zeros - operating mechanism, a spring connected therewith, means operated by said spring for adjusting said bar 18 and means for holding the parts in normal position until the operating devices have moved to a certain position.

102. In a calculating-machine the combination of a movable keyboard provided with a series of sets of depressible keys, a series of step-bars to coöperate therewith, a series of type-bars connected with the step-bars, an inking-ribbon and supporting-spools therefor, means in connection with the actuating means of the type-bar for communicating a rotative movement to one of the spools, a reciprocating member having antifriction-wheels at its two extremities and adapted to be engaged by the ribbon on the spool, when the same is nearly filled, to cause the shifting of the reciprocating member and means actuated thereby for shifting the actuating mechanism from the full spool to the empty spool.

103. In a calculating-machine the combination of a movable keyboard provided with a series of sets of depressible keys, a series of step-bars to coöperate therewith, a series of type-bars connected with the step-bars, ribbon supporting and shifting means, comprising two spools having the ends of the ribbon mounted thereon, pawl-and-ratchet means for actuating one or the other of the spools in connection with the actuation of the type-bar, a shifting member adapted to throw one or the other of the pawls out of engagement with its coöperating ratchet and a reciprocating member adapted to be actuated by the ribbon on the spool that is approximately filled to cause the actuation of the shifting member.

104. In a calculating-machine the combination of a movable keyboard provided with a series of sets of depressible keys, a series of step-bars to coöperate therewith, a series of type-bars connected with the step-bars, an inking-ribbon support and shifting device comprising two spools rotatably mounted and spring-pressed, pawl-and-ratchet means for actuating said spools in connection with the actuating means of the type-bar, a shifting member for alternately throwing out of engagement one pawl with its coöperating ratchet, latching means for normally locking the shifting member, a reciprocating member having antifriction-wheels at its extremities adapted to encounter the ribbon on the spool that is approximately filled to cause the movement of the reciprocating member to actuate the latching means and release and shift the shifting member.

105. In a calculating-machine the combination of a movable keyboard provided with a series of sets of depressible keys, a series of step-bars to coöperate therewith, a series of type-bars connected with the step-bars, an inking-ribbon support and shifting device comprising two spools rotatably mounted and spring-compressed, pawl-and-ratchet means for actuating said spools in connection with the actuating means of the type-bars, a shifting member for alternately throwing out of engagement one pawl with its coöperating ratchet, latching means for normally locking the shifting member, a reciprocating member having antifriction-wheels at its extremities adapted to encounter the ribbon on the spool that is approximately filled to cause the movement of the reciprocating member to actuate the latching means and release and shift the shifting member, and springs operating between the reciprocating member and the shifting member adapted to store power until the latch is released.

106. A series of sets of types for printing numbers of different denominations, devices for adjusting the several sets of types, a member adjustable transversely of said devices and carrying graduated projections, means for adjusting said member in accordance with the highest denomination operated, and operating means for moving said member to engage certain of said devices and adjust the corresponding sets of type to print zero.

107. A series of sets of type for printing numbers of different denominations, a member adjustable in accordance with the highest denomination operated, and having projections so graduated as to move the significant zeros to printing position without affecting the non-significant zeros.

108. A series of sets of type-carriers, normally adjusted not to print and having adjustable connections, a member having projections adapted to engage said connections when in unadjusted position, means for setting said member in accordance with the highest denomination operated, and means for moving said member when set, the projections being so graduated that said movement will adjust unoperated type-carriers to print the significant zeros without printing the non-significant zeros.

109. A series of sets of type-carriers for printing numerals of different denominations including whole numbers and decimals, means for adjusting said type-carriers according to the numerals to be printed, and means for adjusting the type-carriers of unoperated denominations between the decimal-point and the highest denomination operated to print the zeros without printing the non-significant zeros of higher denomination, whether said highest denomination operated be above or below the decimal-point.

110. The combination of type-carriers, devices for adjusting said carriers to print different numerals, the bar 18 having projections 20 of graduated width and the projections 19 at graduated distances from said adjusting devices, an operating mechanism including means for shifting said bar after the type-carriers of operated denominations have been adjusted, whereby the projection 19 corresponding to the highest denominations operated coming in contact with the adjusting device for said denomination results in setting said bar in accordance with said denomination and means on said shifting devices coöperating with said projections to move the type-carriers of unoperated lower denominations to print zero without affecting the type-carriers of higher denominations.

111. The combination of the step-bars 4, the type-carriers adjusted thereby, the shoulders 28 thereon, the bar 18 having graduated projections 20 coöperating with said shoulders to adjust the type-carriers to print the significant zeros, the projections 19 on said bar for stopping it in accordance with an adjusted stop-bar, the operating mechanism, spring connections with said operating mechanism for shifting said bar 18 to set the same, and means for moving said bar to cause its projections to set the type-carriers of unoperated denominations to print the significant zero.

112. The type-carriers, devices for adjusting the same, the bar 18 having the graduated projections the operating mechanism comprising the bar 26$^a$, lever 25 connected to said bar 18, spring means connected to said operating mechanism for shifting said lever 25 and bar 18, notches in said bar 26$^a$ for permitting the lever to shift at predetermined times, means for limiting the movement of said bar 18 in accordance with the highest denomination operated, and means for moving said bar 18 to adjust the type-carriers of unoperated denominations to print the significant zeros.

113. The combination of a movable keyboard, depressible keys mounted on said movable keyboard, means for locking said keys in their depressed position, a bar for releasing said locking means, and a special key operable only when said keyboard is in normal position for operating said bar.

114. The combination of a main frame, a keyboard movable in said frame, depressible keys mounted in said keyboard, means for locking said keys in their depressed position, a bar for releasing said locking means, and a special key mounted on the main frame and coöperating with said bar.

115. The combination of a series of depressible keys, means for locking said keys in depressed position, a bar for releasing said locking means, a special key for operating said bar, and an operating mechanism adapted to move said bar and its key out of coöperative position during the operation of the machine.

116. A movable keyboard carrying depressible keys, means for locking said keys in depressed position, a bar for releasing said locking devices, and means coöperating with said bar for locking the keys against operation after the keyboard has begun to move.

117. A movable keyboard, the depressible keys therein, devices for locking said keys in depressed position, a bar coöperating with said locking devices, and a stationary cam to force said bar into position to lock said locking devices against operation after the keyboard has begun to move.

118. A movable keyboard, depressible keys mounted therein, means for holding said keys in depressed position, and means for locking said means after the keyboard has begun to move.

119. In a multiplying-machine, a register, depressible keys for determining the amount added on said register, at an operation of the machine, a spring-actuated shaft, an escapement mechanism for said shaft actuated at each operation of the machine, and means coöperating with said shaft for returning the depressed keys after a predetermined number of operations.

120. In a multiplying-machine, a register, means for adding upon said register any desired amount at each operation thereof, a spring-actuated shaft, an escapement-wheel on said shaft, a pallet coöperating with said escapement-wheel but movable out of engagement therewith to allow said wheel to be adjusted to any desired extent, means for actuating said pallet at each addition, and means for rendering the adding means inoperative when the escapement-wheel has returned to normal position.

121. The combination of a register, means for adding upon said register any desired amount at each operation thereof, a manually-adjustable cam, a spring-pressed bar moved by said cam when the same is moved to adjusted position, means for latching said bar when so moved, means for returning the cam step by step at each operation of the register, means for tripping the latched bar when the cam returns to normal position, and means coöperating with said bar for rendering the adding means inoperative.

122. A spring-actuated counter comprising an escapement-wheel, a pallet for said wheel having an arm, a register, an operative mechanism therefor, and a yieldably-mounted projection on said operating mechanism for actuating said pallet-arm.

123. A registering mechanism, a multiplication and division indicator coöperating therewith and having two series of numerals from "0" to "9," arranged in opposite order, a shield adjustable to expose one or the other of said series of numerals, and an index coöperating with said numerals.

OTHO E. CLOUD.
ALFRED F. WOOD.

Witnesses:
MAE HOFMANN,
JOHN THIEL.